United States Patent [19]

Lindner et al.

[11] Patent Number: 5,566,803
[45] Date of Patent: Oct. 22, 1996

[54] CLUTCH ASSEMBLY FOR A MOTOR VEHICLE HAVING A FLEXIBLE CLUTCH DISC

[75] Inventors: Joachim Lindner, Schweinfurt; Jörg Sudau, Niederwerrn; Bernhard Schierling, Kürnach, all of Germany

[73] Assignee: Fichtel & Sachs AG, Schweinfurt, Germany

[21] Appl. No.: 438,709

[22] Filed: May 11, 1995

[30] Foreign Application Priority Data

May 13, 1994 [DE] Germany ............... 44 16 949.3

[51] Int. Cl.⁶ ............... F16D 13/68; F16D 3/14
[52] U.S. Cl. ............... 192/70.17; 192/107 C; 192/200
[58] Field of Search ............... 192/70.17, 70.28, 192/107 C, 200

[56] References Cited

U.S. PATENT DOCUMENTS

| Re. 16,014 | 3/1925 | Wemp. | |
| 1,777,399 | 10/1930 | Daukus | 192/107 C |
| 1,971,665 | 8/1934 | Tower | 192/107 C |
| 2,059,158 | 10/1936 | Wemp | 192/107 C |
| 2,189,534, | 2/1940 | Ingersoll et al. | 192/107 CX |
| 2,333,308 | 11/1943 | Goodwin | 192/107 C |
| 2,380,835 | 7/1945 | Goodwin | 192/107 C |

FOREIGN PATENT DOCUMENTS

| 0134980 | 10/1980 | Germany. | |
| 3807702 | 9/1989 | Germany. | |
| 644968 | 10/1950 | United Kingdom | 192/107 C |
| 1345036 | 1/1974 | United Kingdom. | |
| 2222865 | 3/1990 | United Kingdom. | |
| 2262795 | 6/1993 | United Kingdom. | |

*Primary Examiner*—Andrea L. Pitts
*Attorney, Agent, or Firm*—Nils H. Ljungman and Associates

[57] ABSTRACT

This invention relates to a clutch disc for a friction clutch in which the connection between the hub and the friction linings is made by several leaf-spring-like elements distributed over the circumference, which elements are fastened in their central area to the hub, are essentially tangential to the axis of rotation and run at some radial distance from the axis of rotation in both directions, and are connected by means of their terminal areas to the friction linings.

20 Claims, 14 Drawing Sheets

CLUTCH ASSEMBLY FOR A MOTOR VEHICLE HAVING A FLEXIBLE CLUTCH DISC

BACKGROUND OF THE INVENTION

1. Field of the Invention

The present invention generally relates to a clutch disc for a friction clutch for a motor vehicle, which clutch disc comprises a hub with internal gear teeth for attachment to a transmission shaft, which transmission shaft defines an axis of rotation. The clutch disc further includes friction linings in the form of annular discs which are concentric to the axis of rotation and are disposed at some radial distance from the hub. Connecting elements are located between the hub and the friction linings, which connecting elements are in the form of elements similar to leaf springs. The connecting elements have webs or lengths which extend essentially in the plans of the clutch disc.

2. Background Information

One such clutch disc of this type is disclosed, for example, in U.S. Pat. No. Re. 16,014, which discloses a clutch disc including a plane sheet metal element that is divided by openings and radial slots. Starting from the area by means of which the plane sheet metal is fastened to the hub, the plane sheet metal extends radially outward into individual segments. The individual segments comprise leaf-spring-like elements which run or extend radially, and which leaf-spring-like elements in their outer area are designed so that they are in one piece with the spring segments. Such a known design does not have high flexibility, however, since the effective length of the leaf-spring-like elements can essentially be limited.

German Unexamined Patent Application 38 07 702 also discloses a design in which leaf-spring-like elements of hub arms pointing in both circumferential directions extend and are connected in their terminal areas with the friction linings. In this design, of course, there is typically sufficient flexibility, but the design can be quite complex and expensive on account of the many individual parts required.

OBJECT OF THE INVENTION

The object of the present invention is to improve a clutch disc of the type described above, so that the design selected features a simple construction and functions correctly.

SUMMARY OF THE INVENTION

The present invention teaches that this object can be accomplished by means of several leaf-spring-like elements preferably distributed around the circumference of the clutch disc. Each leaf-spring-like element can preferably be fastened in its central area to the hub. Further, each leaf-spring-like element essentially extends essentially tangentially or parallel to the axis of rotation, and at an essentially radial distance from the axis of rotation, pointing in both directions away from the point where each leaf-spring-like element is preferably fastened to the hub. Each leaf-spring-like element is preferably connected by means of its terminal areas to the friction linings. As a result of the use of several leaf-spring-like elements, of the type defined above, which elements can essentially extend in both circumferential directions with respect to the axis of rotation of the hub, or point away from the fastening point, the present invention can essentially be realized using a small number of leaf-spring-like elements, whereby these elements simultaneously can be relatively long, thereby essentially retaining full flexibility.

The present invention also teaches that there can preferably be four elements which are oriented in pairs in a plane, and are opposite one another with respect to the hub, whereby one pair can preferably be rotated by approximately 90 degrees from the other pair, with respect to the axis of rotation, and each element can preferably cross two others. As a result of the orientation taught by the present invention, there is essentially a relatively long longitudinal extension of the leaf-spring-like elements, which means that an essentially high flexibility can be achieved. Furthermore, it can be possible, using only four elements, to realize an essentially symmetrical construction with a few fastening points. The terminal areas of these four elements can result in a total of eight connection points with the friction linings, which essentially can make possible a secure transmission or introduction of torque.

The present invention teaches that to fasten the friction linings by means of spring segments, which spring segments can preferably have fastening feet radially inward of the friction surfaces, each leaf-spring-like element can preferably be riveted in its terminal area to a spring segment. In particular, one pair of elements can be in contact with the fastening feet from the one side, and the other pair of elements can be in contact with the fastening feet from the other side. It can thereby be essentially guaranteed that the individual elements cannot interfere with one another in their areas of axial overlap.

However, this effect can also be achieved by interposing corresponding spacers between the fastening feet and the terminal areas of the one pair of elements. In this manner, all the leaf-spring-like elements can preferably be connected from one side with the fastening feet of the spring segments.

In an arrangement including four leaf-spring-like elements, the present invention also teaches that each element can preferably be designed in its terminal area so that it essentially forms one piece with a spring segment. The design of such a configuration can be particularly simple in terms of the number of individual parts used.

The elements can be fastened to the hub by means of arms which project radially from the hub, and it is essentially easy to create a connection between the arms and the leaf-spring-like elements. This connection is preferably accomplished by means of rivets. The central or intermediate areas of the leaf-spring-like elements can thereby come into contact with the plane surfaces of the hub arms. Other types of fastening, e.g. welding, are of course also possible at this point.

In accordance with one preferred embodiment of the present invention, the leaf-spring-like elements can be curved over their longitudinal extension. Such a configuration can result in an additional length which can increase the desired elasticity.

If the leaf-spring-like elements are curved radially outward, a particularly high elasticity can be achieved.

In an additional embodiment, the present invention teaches that there are preferably three elements which are distributed around the circumference and are offset from one another by approximately 120 degrees. Such a configuration has advantages in terms of a low moment of inertia.

The leaf-spring elements can thereby be curved over their longitudinal extension so that they are curved radially inward. This configuration is advantageous because accommodations can be made for the particular installation requirements, that is, only three elements distributed over the circumference. In accordance with this design, too, it is possible on one hand to rivet each element in its terminal area to a spring segment, or to design the terminal segments so that they form one piece with the corresponding spring segment. In the first case, the design flexibility, both for the elements and for the spring segments, is greater with regard to the specific requirements of the individual part. In the second case, there are fewer individual parts to be manufactured and installed.

The present invention teaches that the ends of each two elements next to one another on the circumference can be connected to a common spring segment. Such a design can simplify the effort and expense required for manufacturing, at least when the connection is made by means of rivets, since significantly fewer rivet elements and riveting processes are necessary.

The elements can advantageously be fastened to the hub by means of a flange which encircles the hub, or by means of several arms which project radially. It is also possible to create the connection to the hub by means of a welding process instead of a riveting process.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the invention resides broadly in a clutch assembly for a motor vehicle, the clutch assembly comprising: a flywheel defining an axis of rotation and an axial direction parallel to the axis of rotation; a clutch disc; a pressure plate for applying an axially directed force to the clutch disc, with respect to the axis of rotation of the flywheel, to engage the clutch disc with the flywheel; the clutch disc being disposed between the flywheel and the pressure plate; the clutch disc comprising an outer periphery; a friction lining disposed on the outer periphery of the clutch disc; the friction lining for contacting the pressure plate and the flywheel during engagement of the clutch disc with the flywheel; means for biasing the pressure plate in at least one of the following directions a) and b): a) towards the clutch disc; and b) away from the clutch disc; means for actuating the clutch disc to engage the friction lining between the pressure plate and the flywheel; the clutch disc further comprising: a hub; and apparatus for connecting the friction lining to the hub; the apparatus for connecting comprising a plurality of connecting members; each of the connecting members having a first end and a second end; the first end of each connecting member disposed at a point of the inner circumference of the friction lining; the second end of each connecting member disposed at another point of the inner circumference of the friction lining; each of the points of the inner circumference of the friction lining being spaced a substantial distance from one another; the first end and the second end of each connecting member extending between inner circumference of said friction lining; the first end and the second end of each connecting member being disposed a substantial distance from one another; each connecting member comprising a central portion disposed between the first end and the second end of each connecting member; the first end of each connecting member being disposed a substantial distance from the hub; the central portion of each connecting member being disposed closer to the hub than the first end; the second end of each connecting member being disposed a substantial distance from the hub; and the central portion of each connecting member being disposed closer to the hub than the second end.

Another aspect of the present invention resides broadly in a clutch disc for a motor vehicle, which clutch disc comprises: a friction lining; the clutch disc comprising an outer periphery; the friction lining being disposed at the outer periphery of the clutch disc; the clutch disc defining an axis of rotation and an axial direction parallel to the axis of rotation; the friction lining comprising a radially inner edge disposed towards the axis of rotation of the clutch disc; the radially inner edge of the friction lining comprising an inner circumference; the clutch disc further comprising: a hub; an apparatus for connecting the friction lining to the hub; the apparatus for connecting comprising a plurality of connecting members; each connecting member having a first end and a second end; the first end of each connecting member being disposed at its corresponding first point of the inner circumference of the friction lining; the second end of each connecting member being disposed at its corresponding second point of the inner circumference of the friction lining; each of the points of the inner circumference of the friction lining being spaced a substantial angular distance from one another, the first end and said second end of each connecting member extending between their corresponding first point and second point on the inner circumference of the friction lining; the first end and the second end of each connecting member being disposed a substantial angular distance from one another; each connecting member comprising a central portion disposed between the first end and the second end of each connecting member; the first end of each connecting member being disposed a substantial distance from the hub; the central portion of each connecting member being disposed closer to the hub than the first end; the second end of each connecting member being disposed a substantial distance from the hub; and the central portion of each connecting member being disposed closer to the hub than the second end.

BRIEF DESCRIPTION OF THE DRAWINGS

The present invention is explained in greater detail below with reference to several embodiments which are illustrated in the accompanying drawings, in which.

DESCRIPTION OF THE PREFERRED EMBODIMENT

Figure 1:
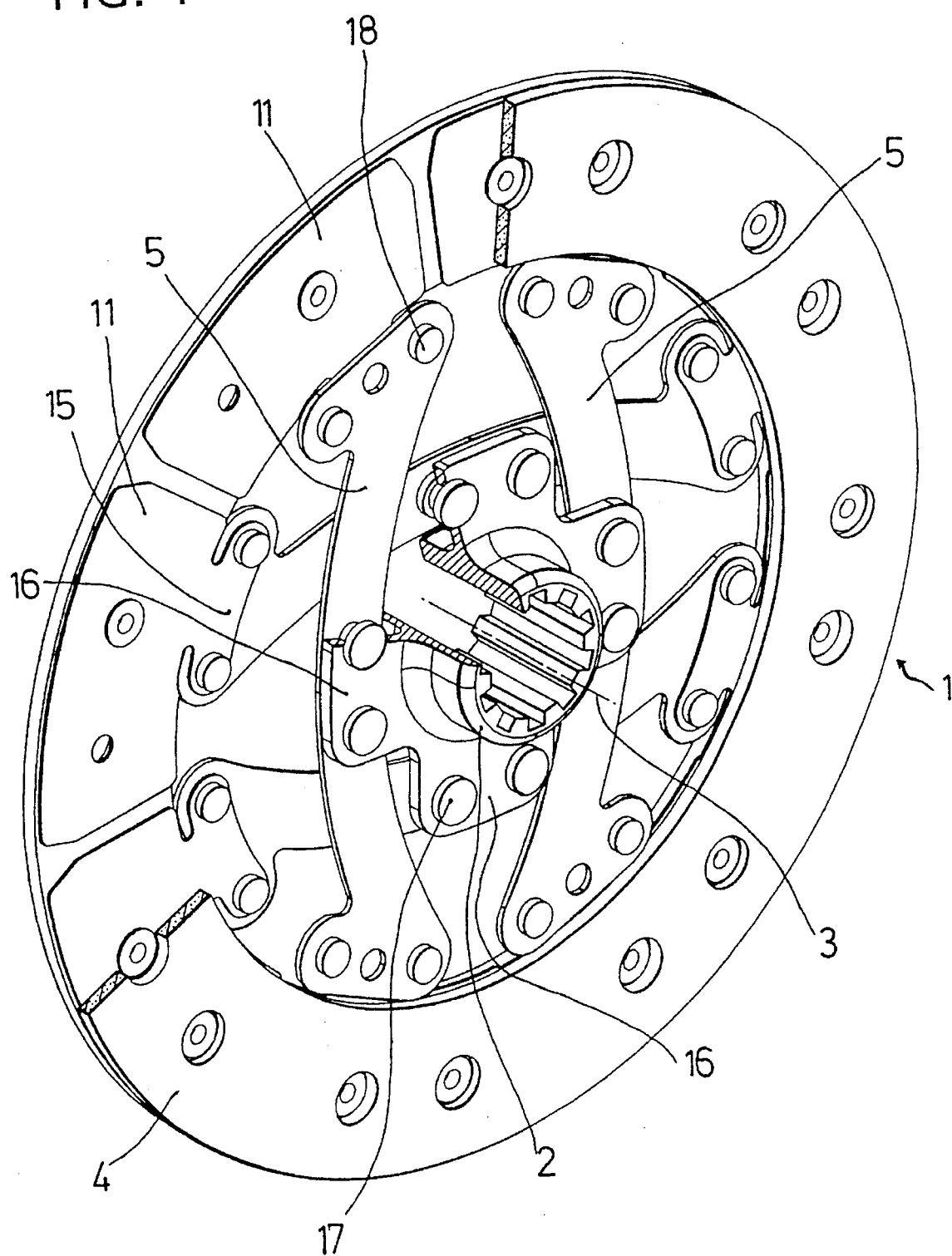
FIG. 1 is a diagonal or perspective view of a complete clutch disc.
Figure 9:
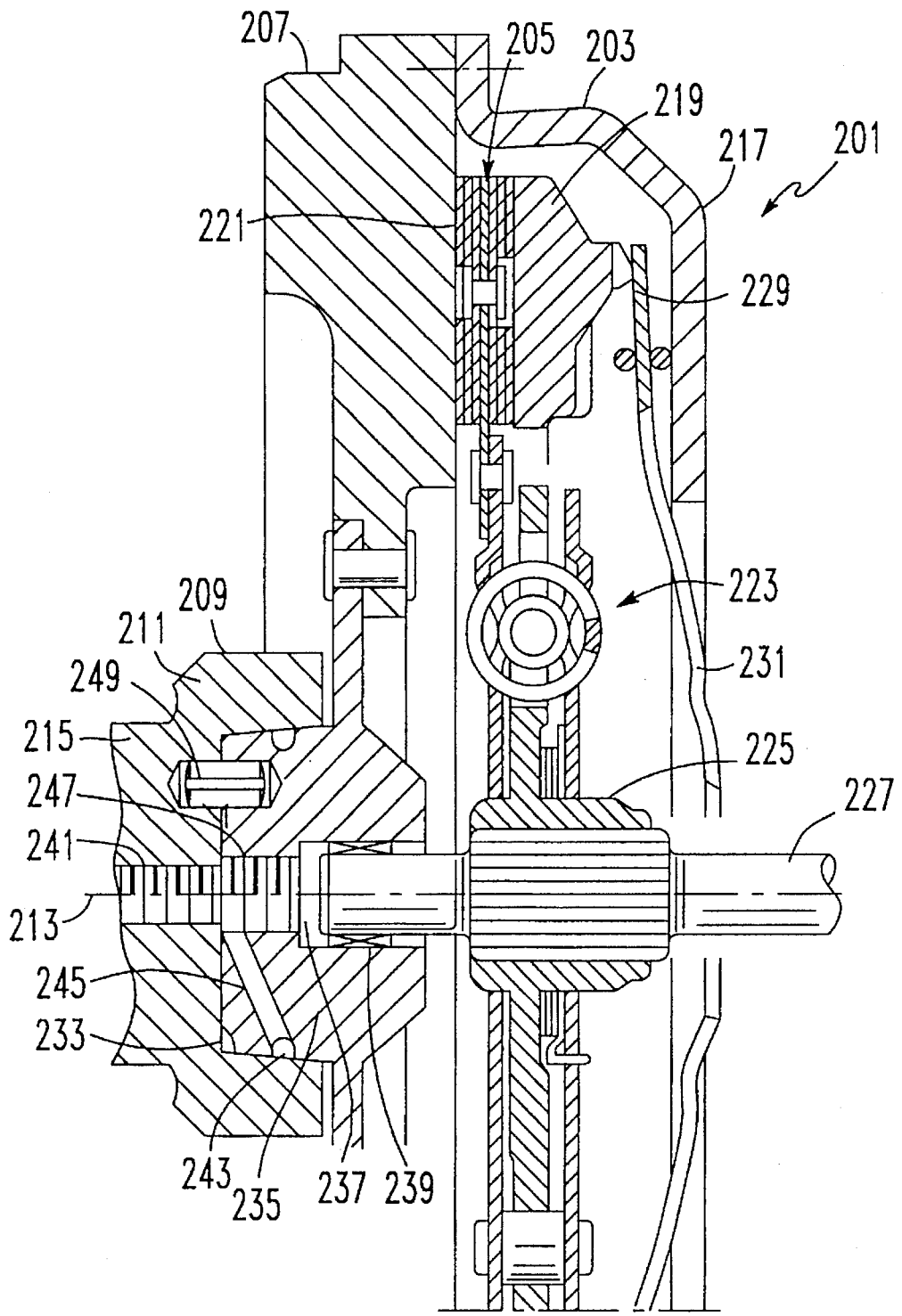
FIG. 9 shows a partial axial longitudinal section through a clutch assembly fastened to a crankshaft of an engine of a motor vehicle.

The clutch disc 1 illustrated in FIG. 1 has a hub 2, which hub 2 can be provided with internal gear teeth for non-rotational attachment to a transmission shaft (see 227 in FIG. 9). The clutch disc 1 can also preferably include friction linings 4 disposed on an outer circumference thereof. The hub 2 can have a total of four radially projecting arms 16 which are distributed around the circumference of the hub 2. Fastened to each of these arms 16 is a leaf-spring-like element 5, which can be fastened in its central area to the hub 2, from which central area the leaf-spring-like elements 5 can run essentially tangentially to the axis of rotation 3. The elements 5 can be connected in both their terminal areas with spring segments 11. There can be a total of four of these leaf-spring-like elements 5 distributed essentially uniformly around the circumference, whereby each of the elements 5 can cross two other such elements 5 between the fastening point on the hub 2 and the connection with the spring segments 11. In this case, the leaf-spring-like elements 5 can be connected to the arms 16 of the hub 2 by rivets 17, and the same type of connection by means of rivets 18 can be made to the spring segments 11. Each spring segment 11 can have a fastening foot 15 with two rivets 18 at some circumferential distance from one another. All of the spring segments 11 can be located on an intermediate radius of clutch disc 1 concentric to the axis of rotation 3, and the spring segment 11 support the friction linings 4.

Figure 2:
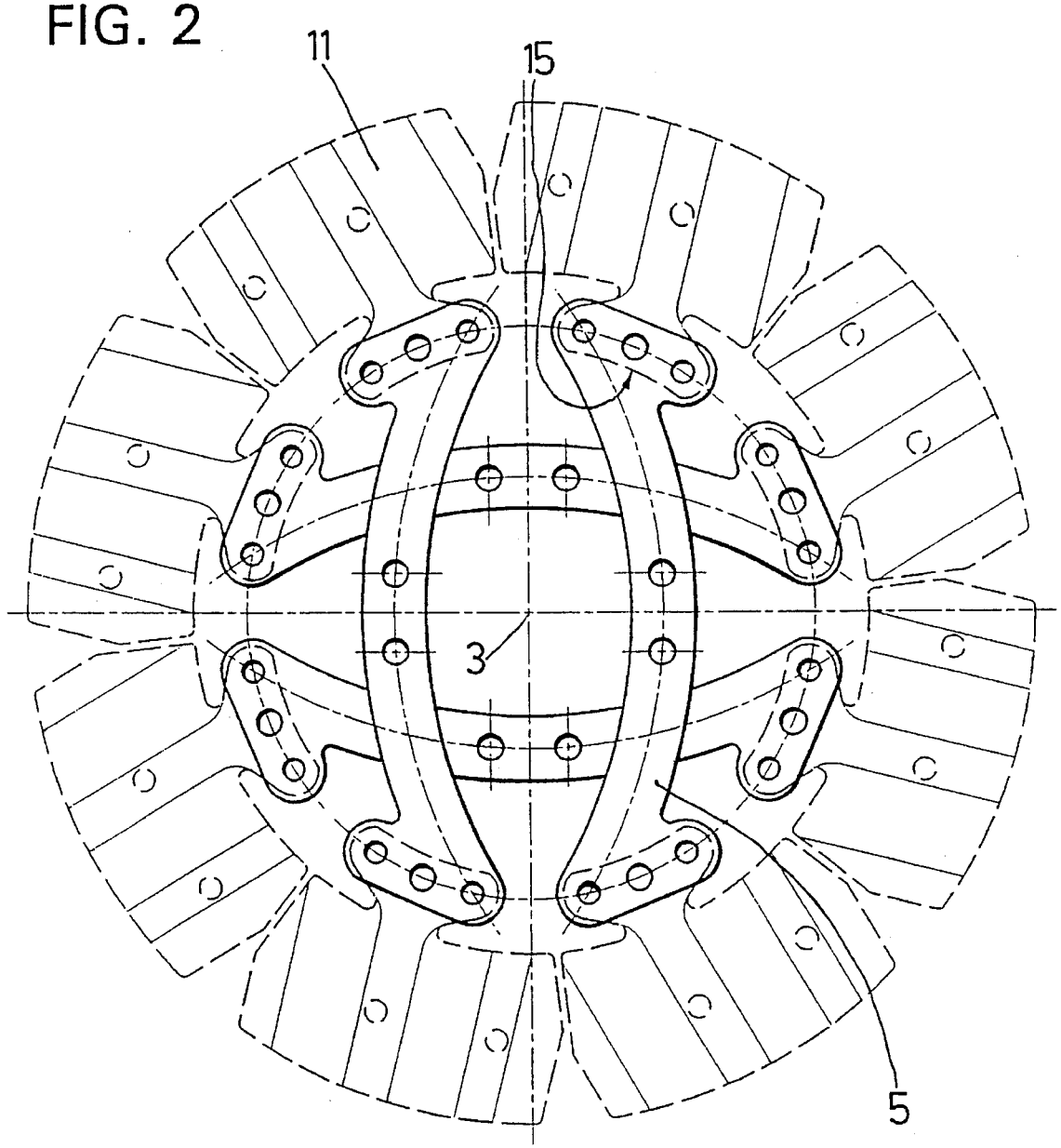
FIG. 2 is a plan view of the clutch disc illustrated in FIG. 1.

FIG. 2 is a plan view of the clutch disc 1 illustrated in FIG. 1. As shown in FIG. 2, the leaf-spring-like element 5, the webs of which can extend essentially in the plans of the clutch disc, can be curved over their longitudinal extension. This curved profile with a curvature toward the radial outside can make possible a relatively long longitudinal extension of each of these leaf-spring-like elements 5, which can increase the potential axial elasticity or ability to wobble. The leaf-spring-like elements 5 can thereby be arranged in pairs in a plane with the two elements 5 of each pair being disposed on opposite sides of the hub 2 with respect to one another. Further, one pair of elements 5 can be offset by about 90 degrees from the other pair, in relation to the axis of rotation 3. One pair of element 5 can thereby be in contact, i.e. riveted, from the one side to the fastening feet 15 of the spring segments 11, and the other pair of elements 5 can be riveted and in contact from the other side.

In other words, in accordance with a preferred embodiment of the present invention, the leaf-spring-like elements 5 can be connected with the spring segments 11 by riveting the corresponding ends of one pair of element 5 to one side of one set of fastening feet 15. Whereas, the corresponding ends of the other pair of leaf-spring-like element 5 can be riveted to the opposing side of another set of fastening feet 15.

Figure 3:
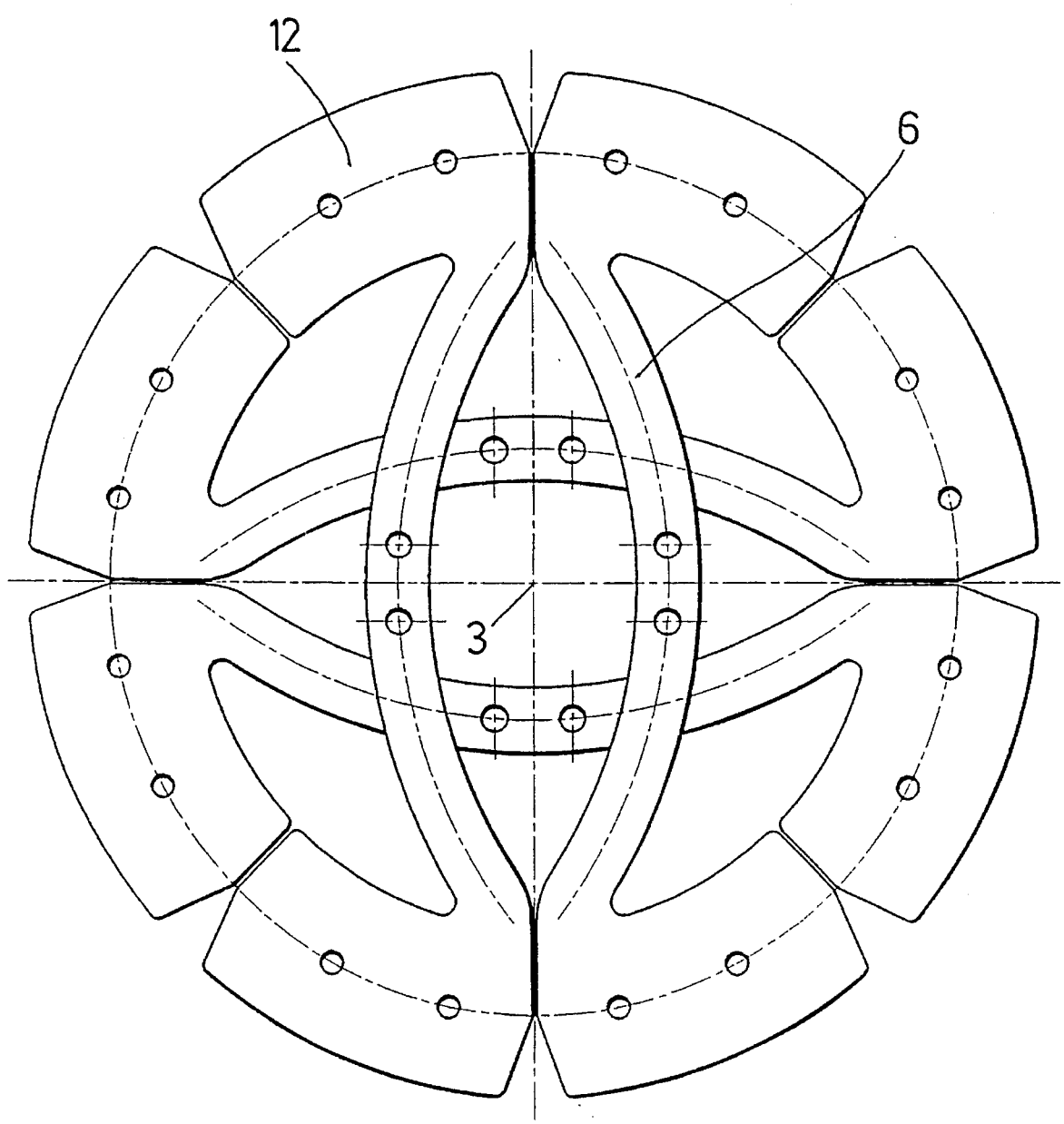
FIG. 3 is a plan view of a clutch disc with spring segments which are integral with the elements.

FIG. 3 illustrates a variant of the embodiment illustrated in FIGS. 1 and 2. In this case, the lead-spring-like elements 6 can be oriented in a manner similar to that show in FIG. 1, and can be offset from one another in pairs by about 90 degrees. However, in the terminal areas of elements 6 farther from the fastening point to the hub, they can be designed so that they form one piece or are integral with the spring segments 12. The result can be a smaller number of individual parts and easier assembly.

Figure 4:
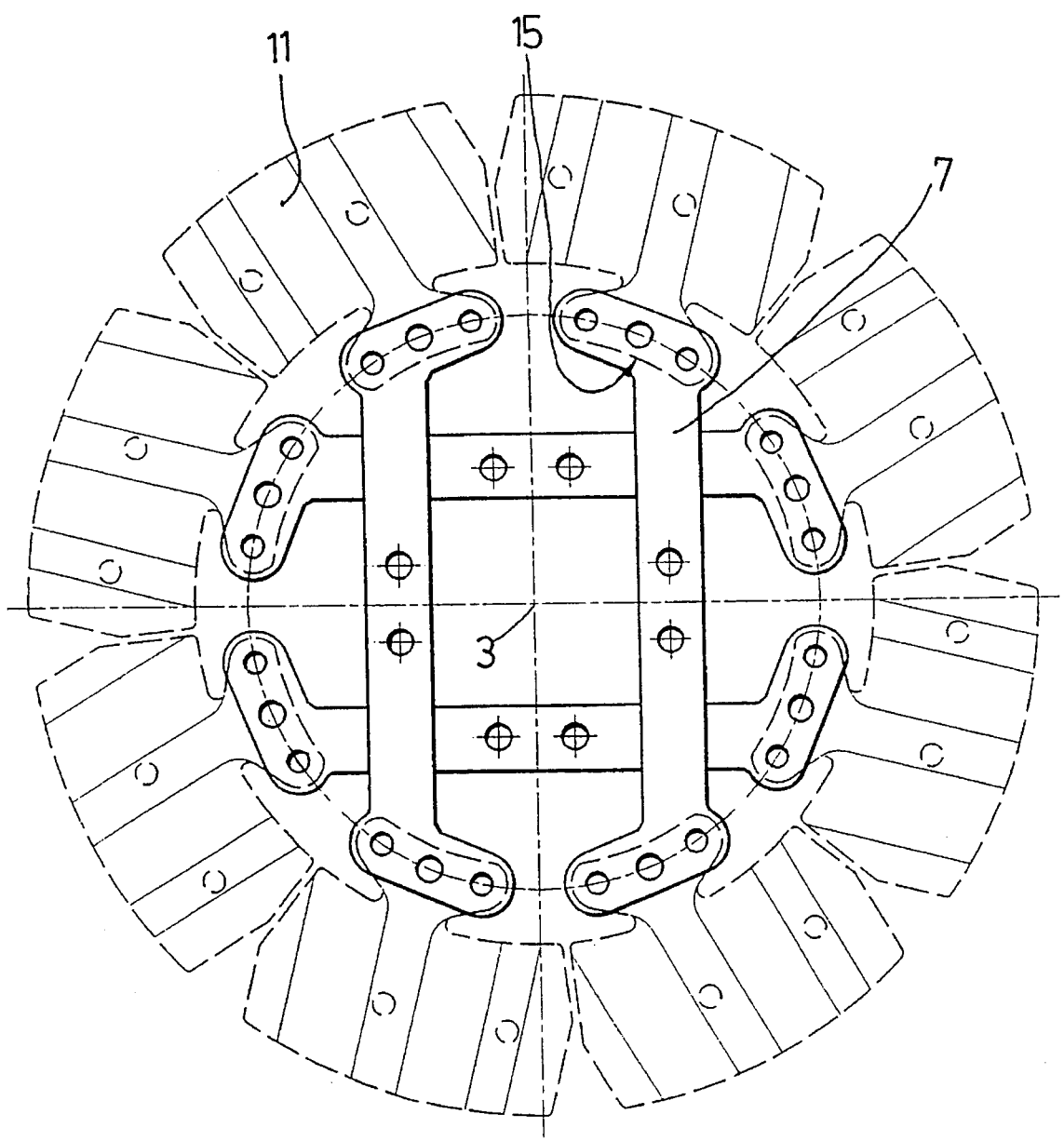
FIG. 4 is a plan view of a variant of the embodiment illustrated in FIGS. 1 and 2.
Figure 5:
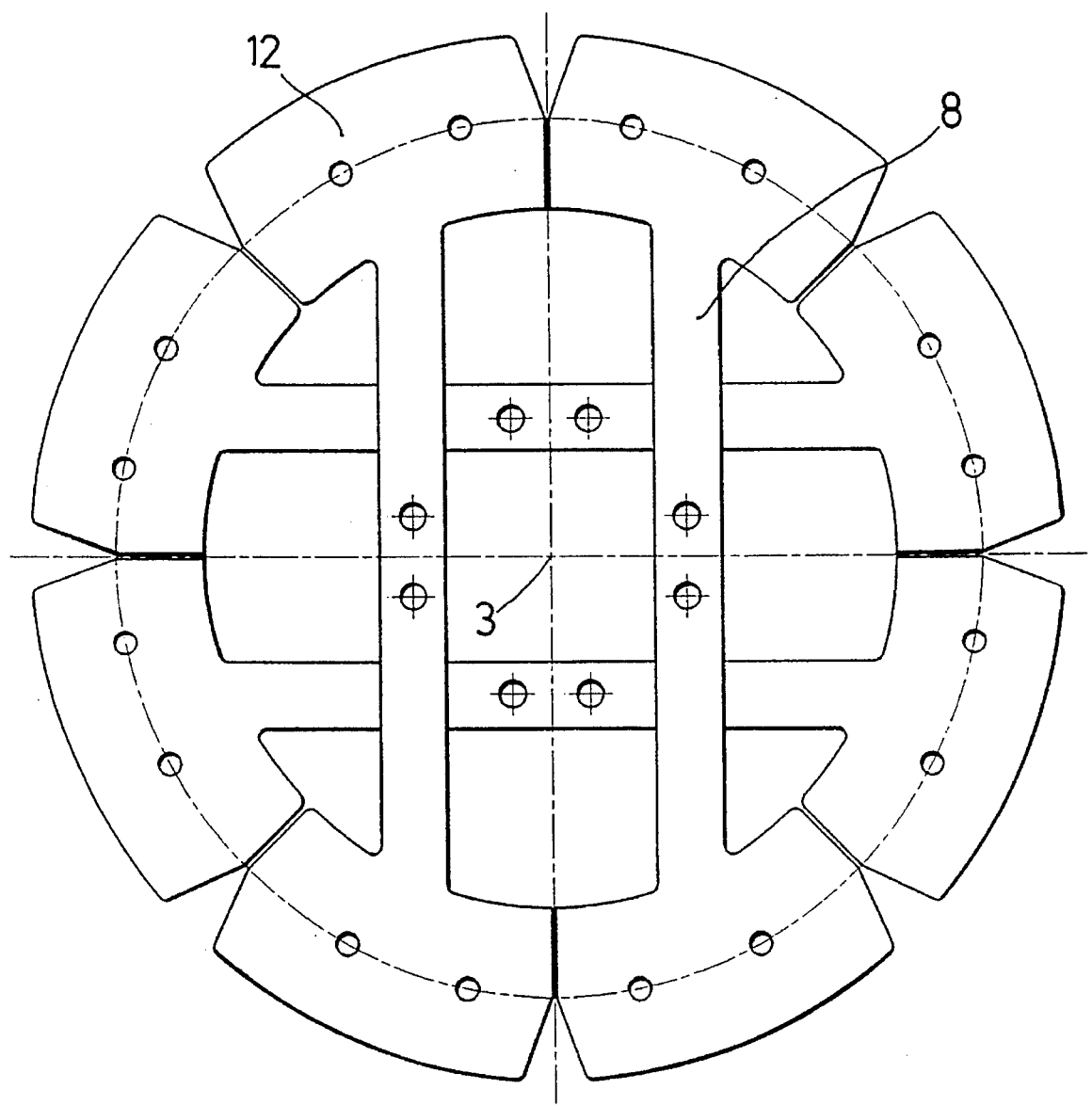
FIG. 5 is a plan view of a variant of the embodiment illustrated in FIG. 4.

FIGS. 4 and 5 each show the basic elements of a clutch disc, whereby in this case the leaf-spring-like elements 7 and 8 extend exactly essentially tangentially to the axis of rotation 3, and on one hand are riveted in their terminal areas to the spring segments 11 and on the other hand are designed so that they form one piece with spring segments 12. In accordance with a preferred embodiment of the present invention, elements 6 can preferably lie in a plane which plane is essentially perpendicular to the axis of rotation 3. In contrast to the embodiments illustrated in FIGS. 1 to 3, the elements 7 and 8 can be designed as essentially straight parts, and can thus be suitable for use in cases where a somewhat reduced elasticity is acceptable.

Figure 6:
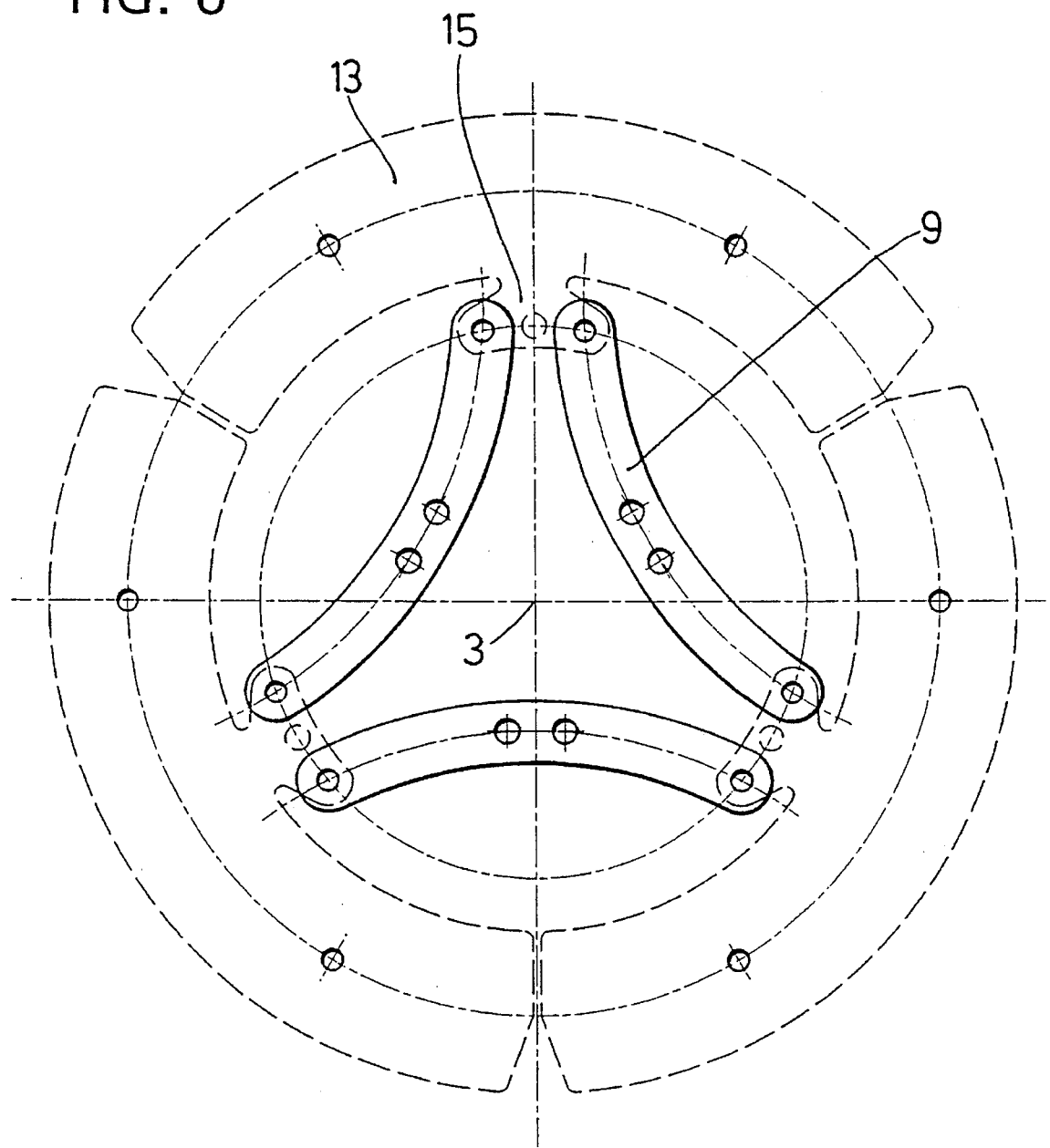
FIG. 6, 6a, and 7 illustrate additional embodiments, each with three leaf-spring-like elements distributed around the circumference.
Figure 7:
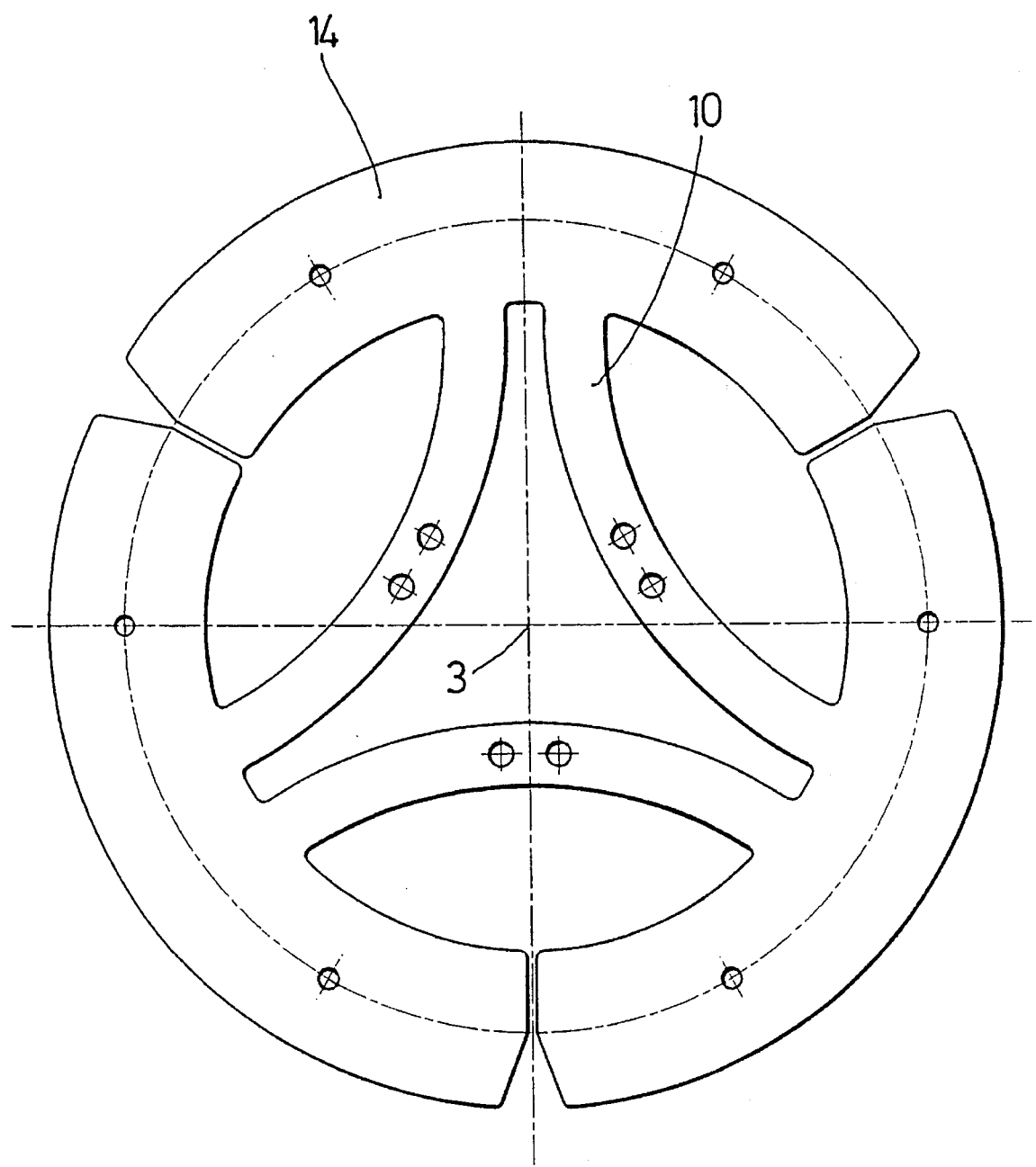

In FIGS. 6 and 7, there are three leaf-spring-like elements 9 and 10, respectively, which element 9 and 10 can be distributed over the circumference of the clutch disc 1 and can be offset from one another by about 120 degrees in relation to the axis of rotation 3. They are also curved over their longitudinal extension, namely curved radially inward toward the axis of rotation 3. In this manner it can be possible to use fewer individual parts, while the longitudinal extension of the individual elements 9 and 10 simultaneously can provide the greatest possible axial elasticity. As shown in FIG. 6, the terminal areas of the elements 9 can be riveted to the feet 15 of spring segments 13, so that the two ends facing one another of two elements 9 are each riveted to a common foot 15 of a spring segment 13. In contrast, as shown in FIG. 7, the invention can also be realized so that a large cohesive or unitary element is formed which combines the leaf-spring-like elements 10 and the spring segment 14 into one piece.

Figure 6A:
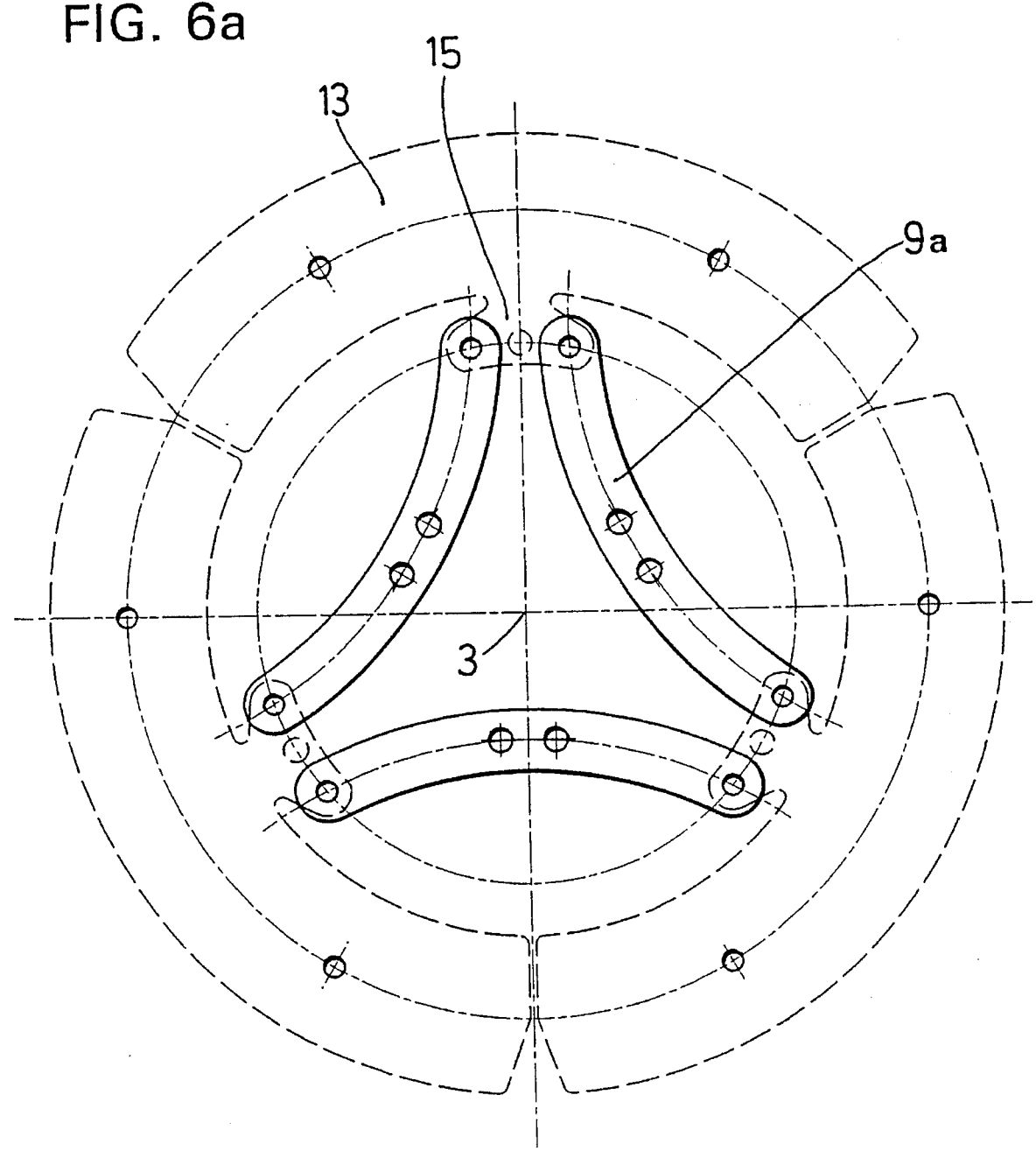

In accordance with a preferred embodiment of the present invention, element 9a, as shown in FIG. 6a, can preferably be curved radially outward.

With reference to the embodiments illustrated in FIGS. 1, 2 and 4, it should be added that the terminal areas of the elements 5 and 7, can also all be connected from one side to the corresponding fasting feet 15 ofthe spring segment 11, whereby under some circumstances, spacers may be provided to bridge the corresponding axial spaces.

In other words, in accordance with a preferred embodiment of the present invention, the leaf-spring-like elements 5 or 7 can be connected with the spring segments 11 by riveting the corresponding ends of one pair of elements 7, for example, to one particular side of the fastening feet 15. Whereas, the corresponding ends of the other pair of leaf-spring-like elements 7, for example, can be riveted to the same particular side of another set of fastening feet 15 by means of spacers to fill the axial spaces.

The connection of the leaf-spring-like elements to the hub can also naturally be accomplished by some means other than riveting, e.g. by welding.

Figure 8:
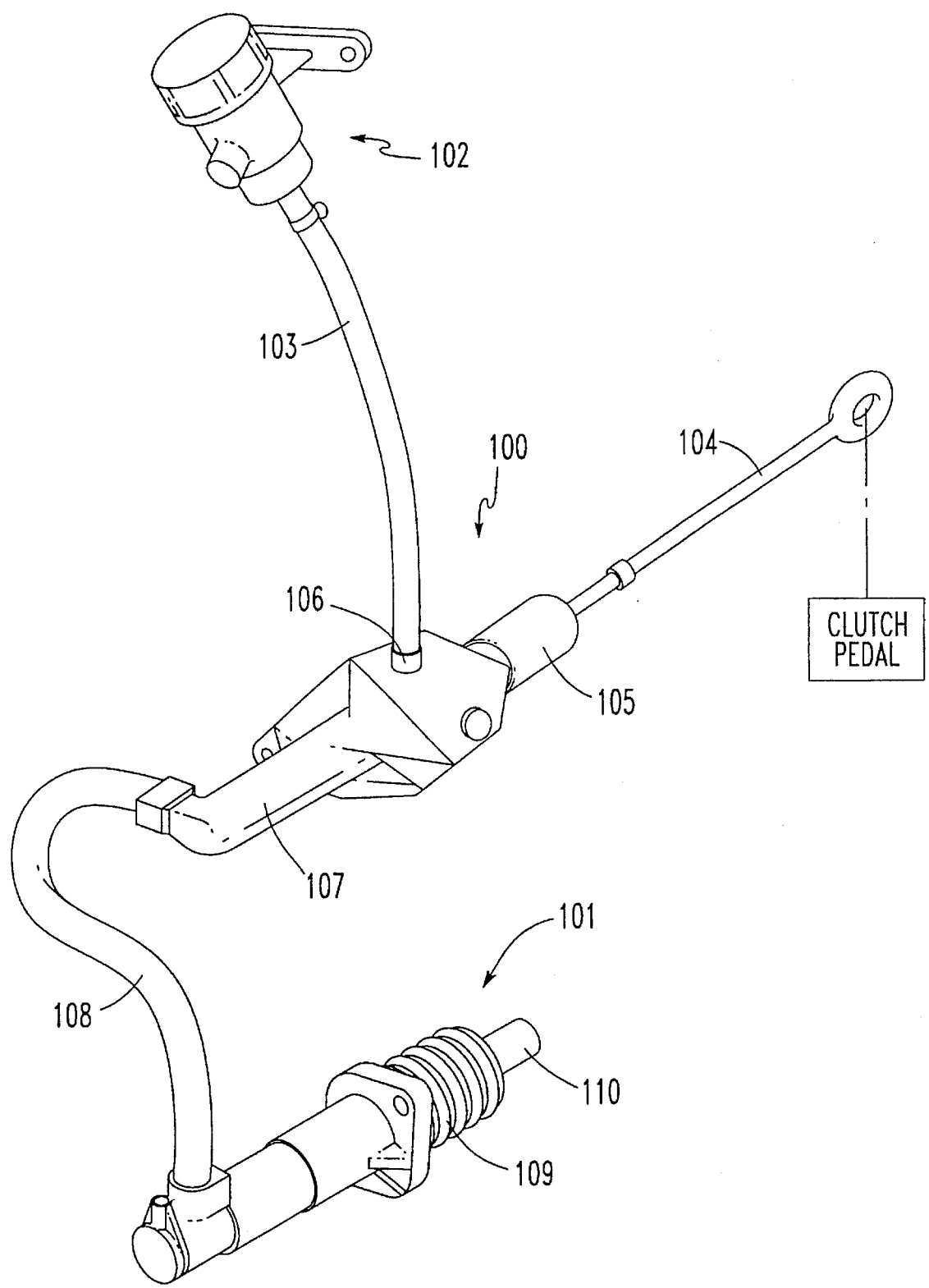
FIG. 8 shows an example of a hydraulically operated clutch assembly.

FIG. 8 essentially shows the connections between a master cylinder 100, a slave cylinder 101 and a fluid reservoir 102. Such a system can preferably have the remote fluid reservoir 102 and the clutch master cylinder 100, with the two being connected to one another by means of a line 103. The clutch master cylinder 100 can preferably be mounted opposite the dash of a motor vehicle, i.e. near the floor where the operator's feet would be, and can preferably be operated essentially directly off of the clutch pedal (shown schematically) of the vehicle, preferably by means of a push rod 104. In addition, the master cylinder 100 and the slave cylinder 101 can have protection boots 105 and 109, respectively. The cylinder or slave cylinder 101 can preferably be mounted by means of fastening connection on the clutch housing.

The clutch master cylinder 100, in accordance with the embodiment shown in FIG. 8, preferably operates as the pump for pumping hydraulic fluid from reservoir 102, via a connection 106 and cylinder 107, to the slave cylinder 101. When the clutch pedal is depressed, hydraulic fluid under pressure can be pumped into the slave cylinder 101, via a line 108, and can cause the piston rod 110 to extend to engage or disengage the clutch as discussed above.

It should be understood that the components discussed herebelow with regard to FIGS. 9–17 can be considered to be interchangeable with similar components discussed above.

FIG. 9 shows a motor vehicle friction clutch 201 with which the present invention could be utilized. The friction clutch 201 shown in FIG. 9 can generally include a pressure plate unit, designated 203 in general, a clutch disc 205 and a flywheel 207. It should be noted that the friction clutch 201 shown in FIG. 9 could incorporate the clutch disc 1 in accordance with the present invention. The friction clutch 201 can preferably be mounted by means of a fastening system 209, preferably on the output end 211 of a crankshaft 215, which crankshaft 215 can rotate around an axis of rotation 213 of an internal combustion engine (not shown) of the motor vehicle.

The pressure plate unit 203, in a manner which is well known in the art, can have a clutch housing 217 which clutch housing 217 can be fixed to the flywheel 207, for example by bolts or by welding, so that the clutch housing 217 can be detached, but preferably does not detach during operation. An essentially disc-shaped application plate or pressure plate 219 can be mounted on the clutch housing 217. The application plate 219 can be mounted by means of tangential leaf springs, for example, which tangential leaf springs are not illustrated in any additional detail, but which tangential leaf springs may be disclosed in U.S. Pat. No. 4,757,597 to Kohler on Jul. 19, 1988, entitled "Method of Assembling a Friction Clutch", and U.S. Pat. No. 4,640,398 to Kolb et al. on Feb. 3, 1987, entitled "Friction Clutch with Tangential Leaf Springs". The application plate 219 can be mounted by means of tangential leaf springs so that the application plate 219 essentially does not rotate, but can preferably move axially.

Preferably between the application plate 219 and the flywheel 207, there can be friction linings 221 of the clutch disc 205, which friction linings 221 can be connected to a hub 225 of the clutch disc 205 in a manner well known in the art, such as by means of a torsional vibration damper 223, preferably in a rotationally elastic manner. The clutch disc 205 can be guided preferably by means of the hub 225 in an essentially non-rotating, but axially movable manner on an input shaft 227 of a transmission. The input shaft 227 can preferably be disposed downstream of the friction clutch 201 in the torque transmission path. A membrane spring 229, preferably held in the clutch housing 217, can apply pressure to the application plate 219, and the friction lining 221 can hold the application plate 219 in a friction-tight manner preferably against the flywheel 207.

The output end 211 of the crankshaft can preferably contain a central opening 233 in the face of the crankshaft 215, the inner jacket or surface of which opening 233 can form a taper surface which can taper axially into the crankshaft 215. A conical extension 235 which can project axially from the flywheel 207, can extend into the opening 233 in the end of the crankshaft 215, and the outer jacket of the conical extension 235 can have a taper surface which can essentially match the inner jacket of the opening 233 in the face of the crankshaft 215. The matching taper surfaces of the opening 233 and of the conical extension 235 can form the essentially axial joint surfaces of a radial interference fit, which can radially guide the flywheel 207 on the crankshaft 215, and can transmit the torque from the crankshaft 215 to the clutch 201.

The conical extension 235 can form a hub of the flywheel 207 and can contain a progressively stepped hole 237, which stepped hole 237 can expand radially toward the clutch disc 205. The stepped hole 237, preferably in its expanded portion, can house a pilot bearing 239, preferably for the radial guidance of the crankshaft-side end 215 of the transmission input shaft 227. The face or central opening 233 can continue or extend along the same axis as the stepped hole 237, preferably into a threaded hole 241, into which threaded hole 241 a clamping bolt (not shown) can be screwed through the hub 225, preferably for the assembly of the friction clutch 201, before the insertion of the transmission input shaft 227 into the hub 225. By means of the clamping bolt, which is not illustrated in any further detail and should be removed following assembly, the conical extension 235 can be axially pressed into the opening 233 in the end of the crankshaft 215.

The flywheel 207 can preferably be removed from the crankshaft 215 by means of hydraulically actuated extraction devices, which can preferably act by means of rod-sleeve connections through the hub 225 of the clutch disc 205 to the connection area 209. The conical extension 235 can be provided with threaded connections, for example, in the vicinity of its graduated or stepped hole 237. The extraction of the flywheel 207 from the output end 211 can also possibly be done by hydraulic expansion of the output end 211. For this purpose, there can preferably be a ring-shaped groove 243 on the circumference of the conical extension 235, which ring-shaped groove 243 can be connected by means of one or more radial channels 245, to a central pressure medium connection, e.g. designed as a threaded hole 247. The threaded hole 247 may form a part of the stepped hole 237. The pressure medium connection 247 can preferably be connected through the hub 225 of the clutch disc 205 to a hydraulic pressure unit (not shown), which hydraulic pressure unit can hydraulically expand the opening 233 in the end of the crankshaft 215, preferably by means of the closed circular line or groove 243.

The flywheel 207 can be connected relative to the crankshaft 215 by means of an indexing pin 249, which indexing pin 249 can define the angular position of the flywheel 207 relative to the crankshaft 215.

It should be understood that the friction clutch 201 shown in FIG. 9 is presented only by way of example of one type of clutch in which the present invention may be incorporated.

The disclosure now turns to additional friction clutch assemblies with which the present invention may be incorporated. The following clutch assemblies shown in FIGS. 10–17 are only presented by way of example of several types of clutch assemblies in which the present invention could be utilized. It should be noted that components discussed hereinabove may be considered to be interchangeable with similar components discussed herebelow with reference to FIGS. 10–17.

Figure 10:
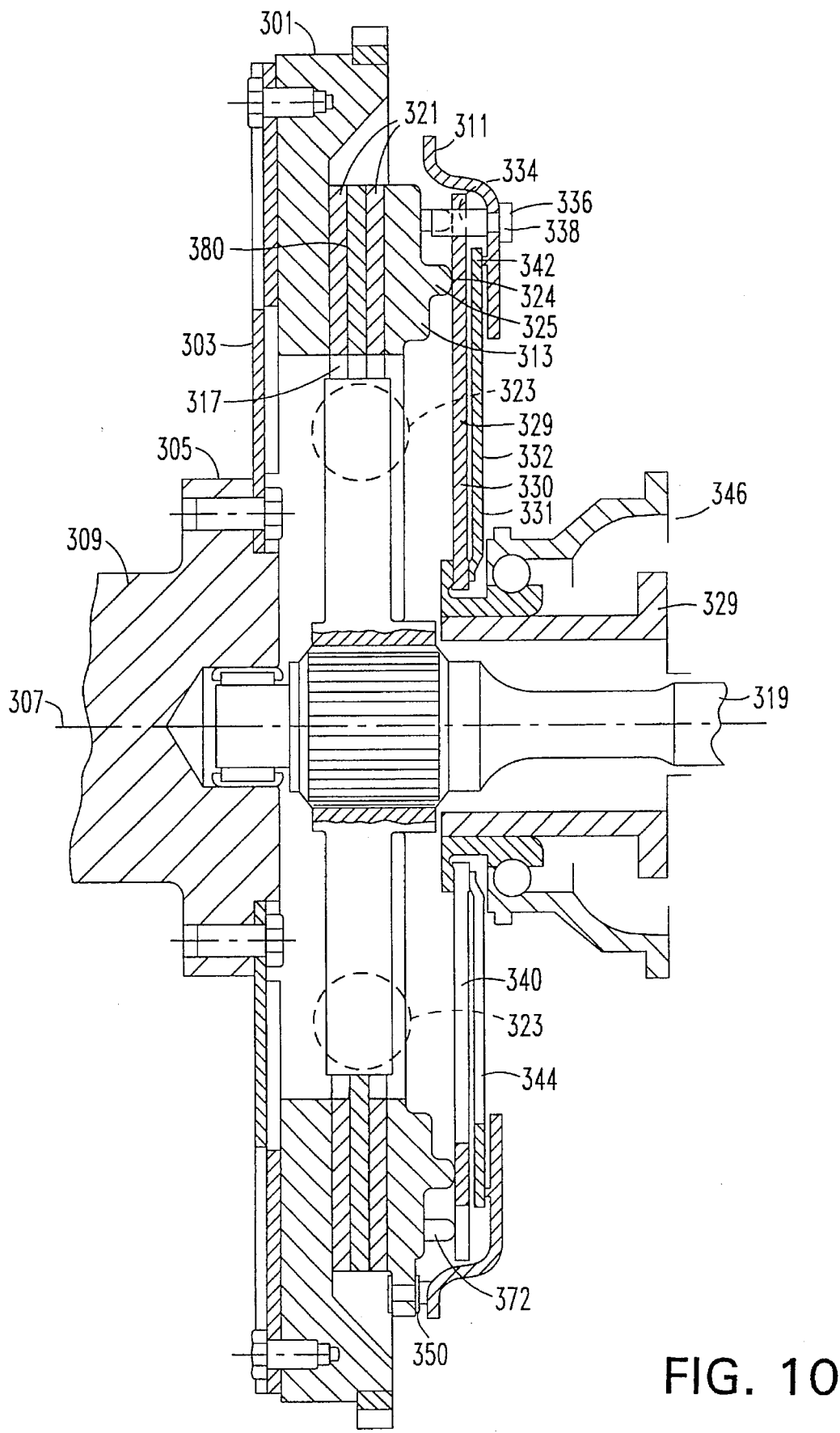
FIG. 10–17 show partial views of additional clutch assemblies.
Figure 10A:
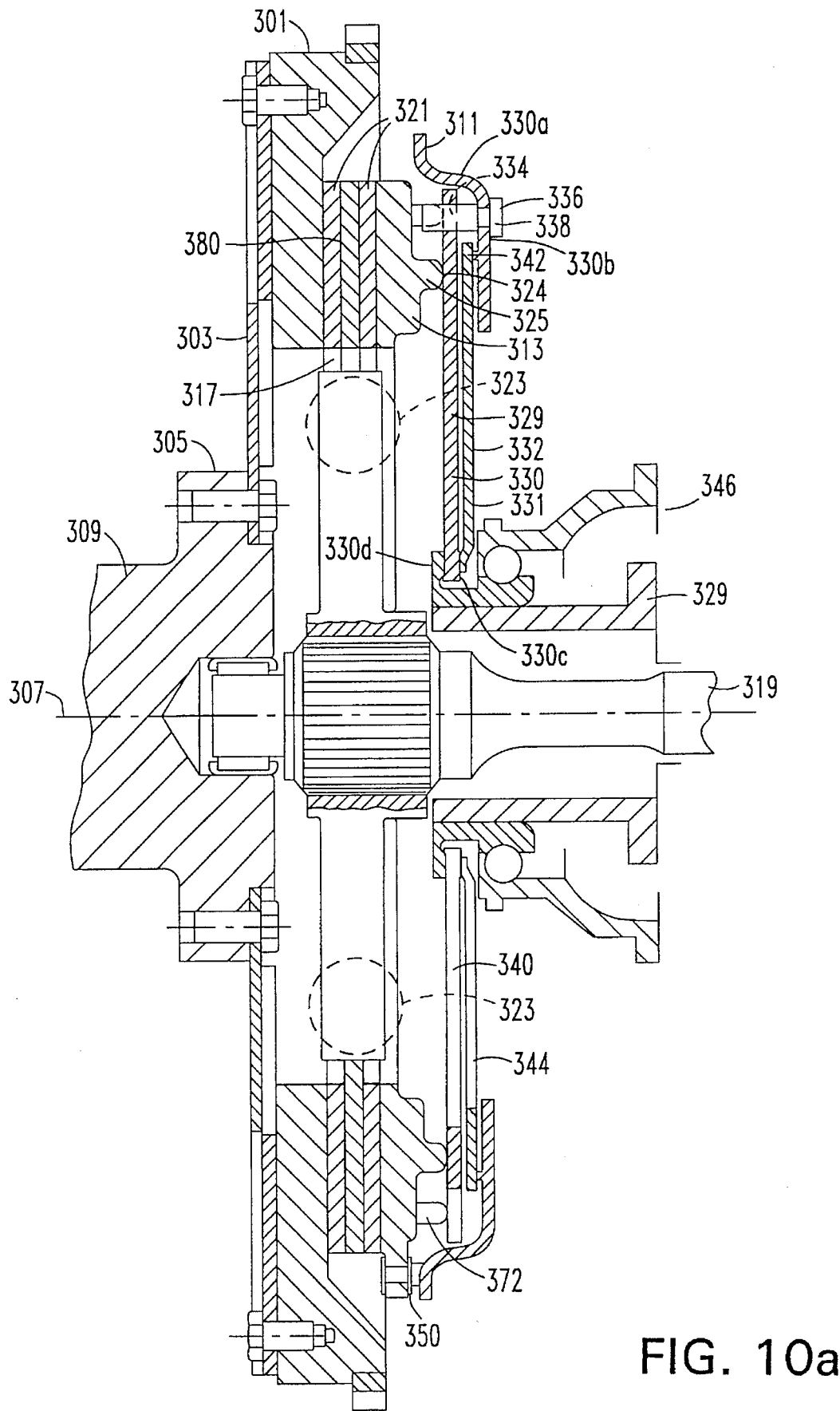

The motor vehicle friction clutch illustrated in FIGS. 10 and 10a comprises a flywheel 301 which is equiaxially fastened by means of a sheet metal disc 303 to a flange 305 of a crankshaft 309 of an internal combustion engine, whereby the crankshaft 309 rotates around an axis of rotation 307. The flywheel 301, in the manner of the known art and therefore not described in any further detail, supports an essentially ring-shaped clutch housing 311 which, on the side of the flywheel 301 facing away from the crankshaft 309, encloses an application plate 313 which is essentially in the shape of an annular disc. The application plate 313 is guided in the circumferential direction non-rotationally, but so that it be displaced axially on the clutch housing 311. Axially between the flywheel 301 and the application plate 313, coaxial with the axis of rotation 307, there is a clutch disc 317 which can be displaced axially in the conventional manner, but is coupled non-rotationally to an input shaft 319 of a transmission which is not shown in any greater detail. This clutch disc 317 supports friction linings 321 with lining springs 380 and can include torsional vibration dampers 323 as well as frictional vibration dampers not shown in any greater detail.

Between the clutch housing 311 on the one side and the application plate 313 on the other side, there are a membrane disc 330 which acts as a transmission element 320, and a membrane spring 332 which acts as the application means 331, whereby the membrane disc 330, in the radially outer area, has recesses 334 which are used for the passage of studs 336 which are fastened to the clutch housing 311 and extend in the axial direction of the pressure plate 313, and the membrane disc 330 is movably mounted by means of these recesses on the studs 336, which are part of an axial guidance 338 for the membrane disc 330. The membrane disc 330, which has tabs 340 which extend radially inward, comes into contact with its opposite side against stops or shoulders 325 of the application plate 313 which function as contact points 324.

The membrane spring 332 is braced between the membrane disc 330 and a wire ring 342 which surrounds the axis of rotation 307, and which is in contact with the corresponding side of the clutch housing 311, and presses the tabs 340 of the membrane disc 330 by means of its own flexible tabs 344 which extend radially inward around the shoulders 325 of the application plate 313 onto the latter. There is a translation of the application force generated by the membrane spring 332 between the application point of the flexible tabs 344 and the shoulders 325 in relation to the latter and the studs 336, to which the membrane disc 330 can be clamped by deformation. By means of a release mechanism 346 which is guided so that it can be displaced axially on a guide tube 329 of the transmission, and which is engaged on the radially inner ends of the flexible tabs 340 of the membrane disc 330, the application plate 313 can be relieved of the application force of the membrane spring 330 and released.

During release, as a result of a movement of the release mechanism 346 as illustrated in FIGS. 10 and 10a to the right, the excursion of the tabs 340 of the membrane disc 330 and of the flexible tabs 344 of the membrane spring 332 is eliminated, as a result of which the application force acting between the application plate 313 and the friction lining 321 of the clutch disc 317 is also eliminated. The deformation of the membrane disc 330 and thus its clamping connection to the studs 336 of the axial guide 338 is completely eliminated as soon as the application plate 313, although still in contact with the friction lining of the clutch disc 317, no longer transmits any application force to the friction lining 321. The neutralization of the application force is achieved by an axial movement of application plate 313 and membrane disc 330 over a negligibly short movement segment which corresponds to the deformation of the friction linings 321 caused by the application force.

In an additional movement segment, the membrane disc 330 is pulled by the release mechanism 346 with a movement parallel to itself into its release position. The application plate 313 is simultaneously pushed into its release position, to the right as shown in FIGS. 10 and 10a, by energy storing devices 350 in the form of leaf springs fastened in the circumferential area and connecting the application plate 313 to the clutch housing 311.

For engagement, the release mechanism 346 is released, so that the membrane spring 332, on account of its prestress, can displace the membrane disc 330 by means of a movement of the latter parallel to itself in the axial direction, until the membrane disc 330 comes into contact with the shoulders 325 of the application plate 313, and has pushed them against the friction lining 321 of the clutch disc 317. This position of the membrane disc 330 and application plate 313 forms the clutch point, since, starting from this position, the engagement is effected by application of the application force. As a result of the continued action of the membrane spring 332, the tabs 340 of the membrane disc 330 are moved toward the application plate 313 around their shoulders 325, whereby the membrane disc 330 is clamped on the studs 336 of the axial guide 338, and the transmission of the application force to the application plate 313, and from the latter to the friction lining 321 of the clutch disc 317, proceeds with the above-mentioned translation.

On the pressure plate 313, accordingly, only inside the above-mentioned movement segment, in which the tabs 340 of the membrane disc 330 are moved around the shoulders 325 of the application plate 313, is there a deformation of the membrane disc 330. On account of the negligible length of this first movement segment, the work which is required to deform the membrane disc 330 is also negligibly low. In the additional movement segment, in which the membrane disc 330 is only displaced parallel to itself without any deformation, only as much work must be applied as is necessary to overcome the friction during the pushing movement. The work required for the total release or engagement process is consequently minimal.

On account of the mobility of the membrane disc 330 in the axial direction inside the additional movement segment, its stroke length during each engagement process is a function of the wear and thus of the thickness of the friction linings 321 on the clutch disc 317, since the membrane disc 330, driving the application plate 313, is always moved far enough toward the clutch disc 317, until the application plate 313 comes into contact with the friction linings 321. Then, when the application force is applied, the clamping connection between the membrane disc 330 and the studs 336 of the axial guide 338 is produced, so that a readjustment of the coupling or clutch point occurs during each engagement process.

Since the movement segment in which the membrane disc 330 can be moved parallel to itself increases in size with increasing wear to the friction linings, a release mechanism 346 is required, the stroke length of which can be adapted to the axial shifting of the coupling or clutch point. This is easy to accomplish, in particular when a hydraulic release mechanism 346 is used, since when there is a change in the stroke length, the hydraulic release mechanism 346 can draw the missing amount of hydraulic fluid. Such a release mechanism 346 is disclosed, for example, in German Patent No. 39 16 317 A1.

If, in the absence of a membrane spring 332, the application means 331 are formed by an engagement mechanism 347 (shown in FIG. 12), it is also possible to achieve a change in the stroke length with it in the manner described above. Embodiments with an engagement mechanism 347 are described in detail below.

Figure 11:
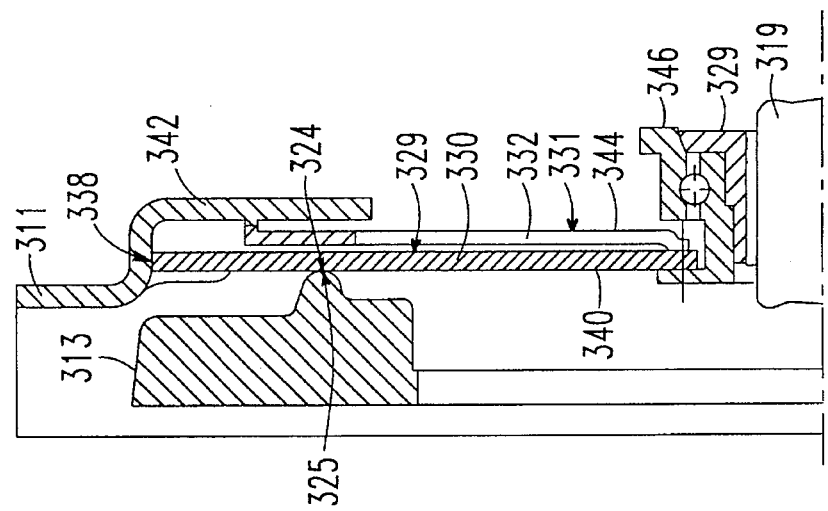

In the illustration in FIG. 11, which is simplified in relation to FIGS. 10 and 10a and shows a pressure plate which differs from FIGS. 10 and 10a in that the axial guidance 338 of the membrane disc 330 takes place in the radially outer area on a segment of the clutch housing 311 which runs axially. Consequently, the clamping of the membrane disc 330 occurs when there is an excursion of the tabs 340 around the shoulders 325 with respect to the segment of the clutch housing 311 which runs axially.

FIGS. 12 through 17 are simplified in relation to FIGS. 10 and 10a and omit details of the structure of FIGS. 10 and 10a.

Figure 12:
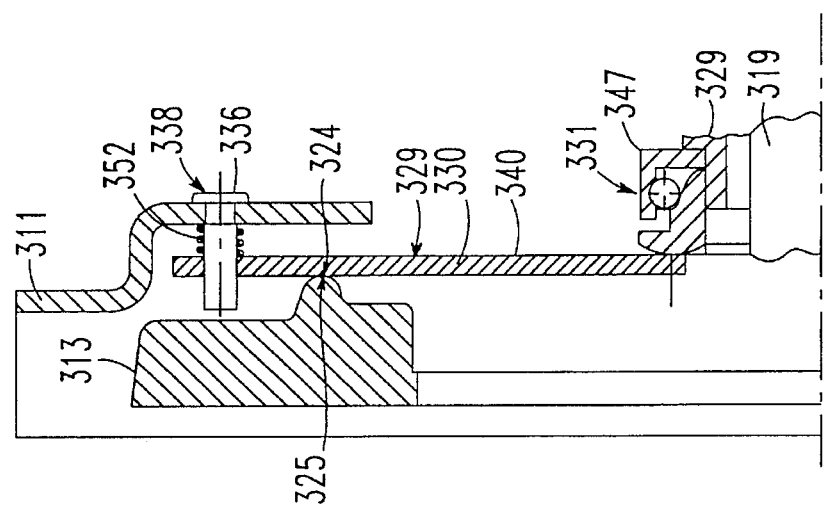

FIG. 12 shows a pressure plate 313 in which the membrane disc 330 is mounted so that it can be displaced on studs 336 of the axial guide 338. In this model, however, an engagement mechanism 347 acts as the application means 331, while one of the springs 352 surrounding the studs 336, the force of which is lower by several times than the application force, provides for the membrane disc 330 to be held in contact with the shoulders 325 of the application plate 313. During release, the application plate 313 is moved by the energy storing devices 350 (FIGS. 10 and 10a) located in its circumferential area toward the studs 336, and thereby displaces the membrane disc 330 parallel to itself against the action of the springs 352. During engagement, this process takes place in the opposite direction, whereby, as soon as the application plate 313 has come into contact with the friction lining 321 of the clutch disc 317, the membrane disc 330, which is clamped to the studs 336 in the vicinity of its tabs 340, experiences an excursion toward or with respect to the shoulders 325 of the application plate 313.

Figure 13:
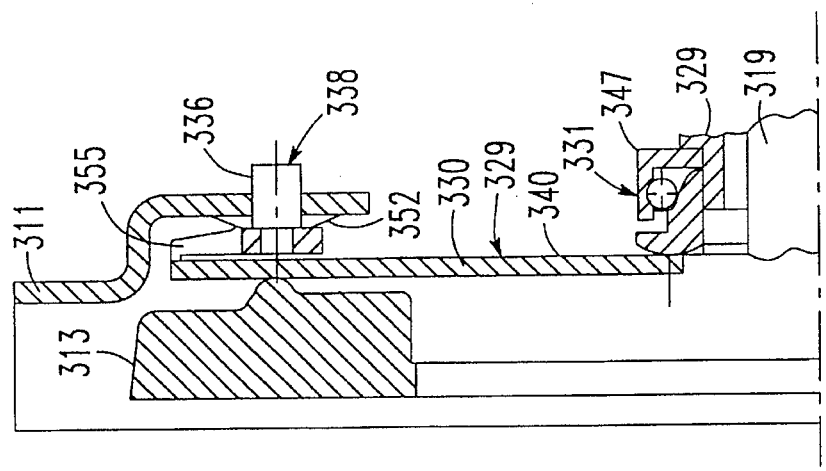

In the embodiment illustrated in FIG. 13, the studs 336 are mounted so that they can move in the clutch housing 311, and support a lever 355 which is supported on one end by means of a spring 352 on the clutch housing 311, and on the other end on the membrane disc 330 in its radially outer area. During engagement, the engagement mechanism 347 which acts as the application means 331 displaces the membrane disc 330 parallel to itself, until the application plate 313 comes into contact with the friction lining 321 of the clutch disc 317. When the application force is applied, the axially movable studs 336 are clamped by means of the levers 355 in the clutch housing 311, whereupon the excursion of the tabs 340 of the membrane disc 330 can take place toward the application plate 313 around their shoulders 325.

Figure 14:
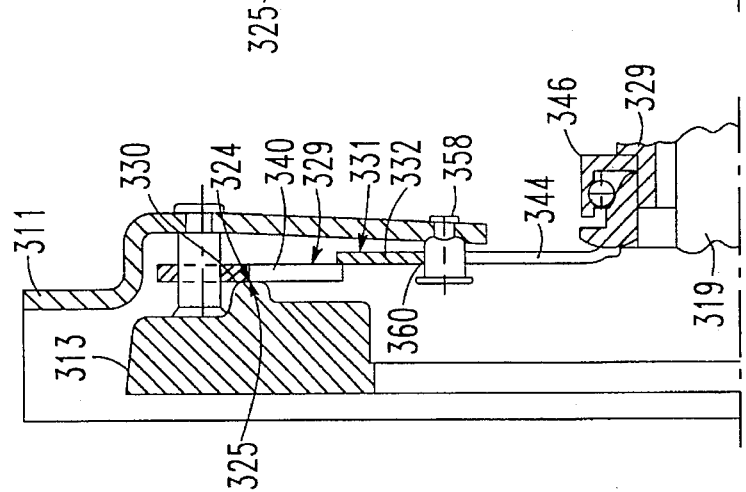

FIG. 14 illustrates an additional embodiment of the pressure plate with a membrane spring 332 which acts as the application means 331. In this case, the membrane disc 330 which is mounted so that it can move on the studs 336 is designed with severely shortened tabs 340, while the membrane spring 332, which is braced radially farther inward on the clutch housing by means of studs 358 and wire rings 360, extends radially outward just far enough so that it becomes engaged with the shortened tabs 340 of the membrane disc 330. As soon as a release mechanism 346 transmits a force toward the application plate 313 to the flexible tabs 344 of the membrane spring 332, the membrane spring 332 is separated from the tabs 340 of the membrane disc 330 in the radially outer area, so that the transmission of an application force ends and the application plate 313, under the action of the energy storing devices 350 (FIGS. 10 and 10a) in its circumferential area displaces the membrane disc 330 toward the membrane spring 332. For engagement, the release mechanism 346 is pulled back into its initial position by relieving the force.

Figure 15:
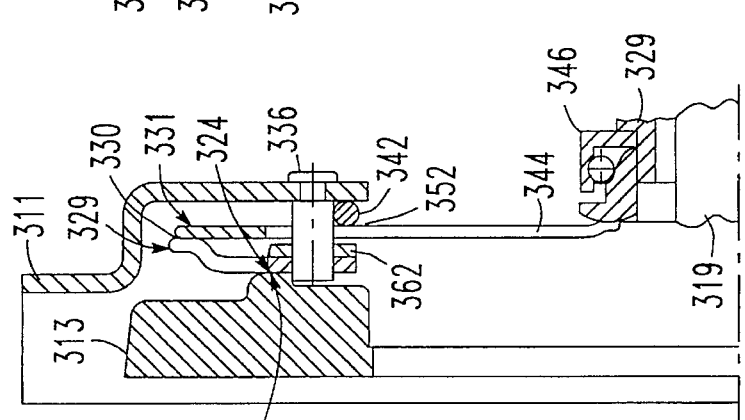

On the pressure plate illustrated in FIG. 15, the membrane spring 332 which forms the application means is fastened to the studs 336 of the axial guide 338, while the plastically deformed membrane disc 330 can be moved in the axial direction of the studs 336. In this case, the membrane spring 332, which is in contact with the membrane disc 330 in the radially outer region, pushes the membrane disc 330 toward the pressure plate 313, and pushes it and the pressure plate 313 until the latter comes in contact with the friction lining 321 of the clutch disc 317. As a result of the deformation of the membrane disc 330 during transmission of the application force, this deformation force causes a tilting of the discs 362 located between it and the membrane spring 332 and supported by springs 352 on the clutch housing 311, on the studs 336, and thus a clamping of the membrane disc 330 on the axial guide 338. The membrane disc 330 is then in contact with the shoulders 325 of the clutch disc 317, and is bent with its area lying radially outside these shoulders around the shoulders 325 toward the application plate 313. To release the application force, a release mechanism 346 is moved toward the application plate 313 against the radially inner ends of the tabs 344 of the membrane spring 332.

Figure 16:
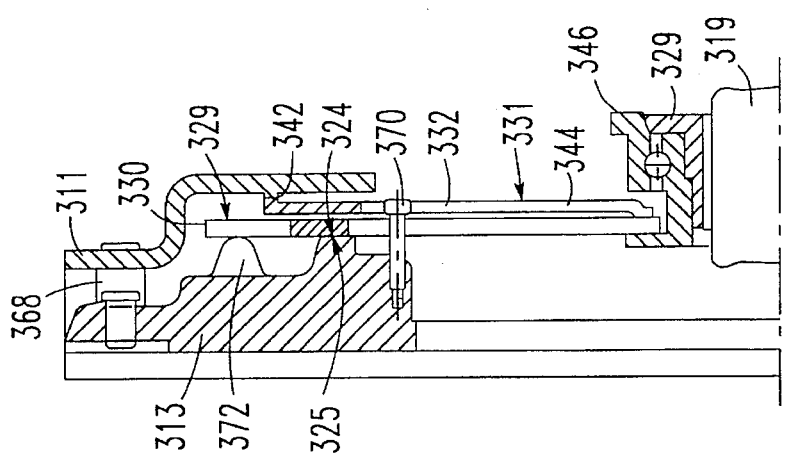

In FIGS. 10 and 10a, the energy storing devices 350 were prestressed in the circumferential area of the application plate 313 so that, when the application force was released, the application plate was moved toward the membrane disc 330 or toward a membrane spring 332. In contrast, FIG. 16 shows a pressure plate in which energy storing devices 368 in the form of leaf springs are active in the opposite direction, and to suppress vibrations of the application plate, they prestress or bias the application plate toward the friction lining of the clutch disc 317, and thus generate a forced clearance of the application plate 313 from the transmission element 329. These energy storing devices 368 cooperate with a retaining means 370 which is formed, as shown in FIG. 16, by screws which are screwed into each threaded hole of the application plate 313, the heads of which are supported on the membrane disc 330 with their sides facing the application plate 313. By means of these retaining means, the application plate 313 is prevented from moving excessively far from the membrane disc 330 as a result of the action of the energy storing device 368. By means of shoulders 372 which are formed on the pressure plate radially outside its shoulders 325 and next to the studs 336, the membrane disc 330 can in this case be supported so that a deformation of the membrane disc 330 in the vicinity of the studs 336 can be prevented. Such shoulders 372, as shown in FIGS. 10 and 10a, can also be advantageously used with energy storing devices 350 which work in the opposite direction.

Figure 17:
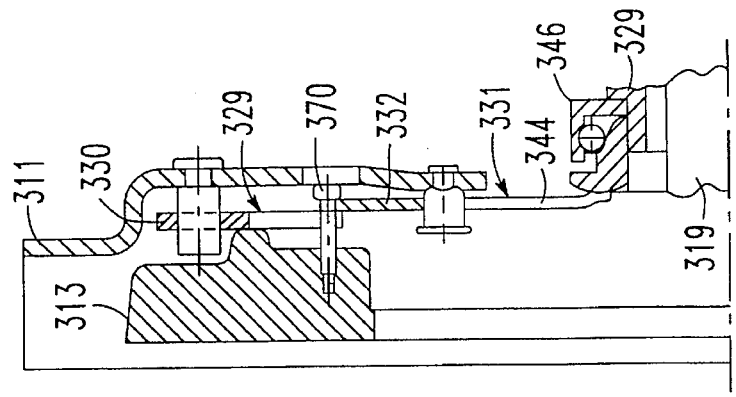

The pressure plate illustrated in FIG. 17 has the same basic construction as the one illustrated in FIG. 14, but is designed with a retaining means 370 in the form of a screw, the head of which is supported with its side facing the application plate 313 on the membrane spring 332, which in turn means that this pressure disc or plate is designed with an energy storing device 368 in the circumferential area of the application plate 313, by means of which the latter can be pressed toward the friction lining of the clutch disc.

Instead of the membrane disc 330 as shown in the drawing, the transmission element 329 can also be formed by lever-like individual segments, each of which is located on at least one stud 336 in the axial guide 338. Since these individual segments are located inside the clutch housing 311, as is the above-mentioned membrane disc 330, they are not illustrated in an additional figure.

In one embodiment of the invention when the membrane disc 330 is held against the stops 325 by among other structures the application means 331, the membrane disc 330 is compressed and thus "oil cans" such that the end 330a with the holes 330b, which holes 330b surround the studs 336, and can grasp and release the studs 336. The end 330a is distorted by the oil canning such that the holes 330b become distorted and grasp the studs 336. As the release mechanism 346 moves the end 330c of the membrane disc 330 to the right, the oil canning of the membrane disc 330 is preferably reduced, therefore reducing the distortion of the end 330a of the membrane disc 330, and thus the holes 330b will be enlarged along the longitudinal axes of the studs 336 such that they no longer clamp onto the studs 336 thereby allowing the application means 330 to move at least relatively freely upon the studs 336. When the release mechanism 346 moves to the left which permits the end 330c of the membrane disc 330 to move to the left, the holes 330b again grips the studs 336. Thus the membrane disc 330 applies a force onto the stops 325 to engage the clutch friction lining 321.

As the application means 331 reduces pressure against the end 330c of the membrane disc 330, the end 330c is moved to the left, which therefore in at least one embodiment "oil cans" the membrane disc 330 between the stops 325 and the point of contact 330d between membrane disc 330 and release element 346. This oil canning twists or distorts the end 330a of the membrane disc 330 so that the membrane disc 330 again deforms at end 330a to clamp the holes 330b about the studs 336.

Further regarding the membrane disc 330, as is well known with membrane or Belleville discs or springs depending upon the thickness, the length and restraints built within the Belleville washer or disc, which restraints restrict the movement of the diaphragm structure of the Belleville washer or disc, as the Belleville washer is moved from a relaxed or externally unrestricted state, the stresses within the Belleville disc or spring are set up in a static fashion. The static stresses within the Belleville disc when the disc 330 is not externally stressed by the release mechanism 346, typically form a curve where the center portion of the disc represented by the end 330c in FIG. 10a, is displaced axially from the end 330a, as shown in FIG. 10. The curve of the Belleville washer or membrane spring 330, will have this curvature, and the holes 330d which grasp the studs 336 due to the distortion thereof, and therefore clamp the membrane disc 330 onto the studs during operation. These holes 330d on end 330a will be bored so that they align with the studs 336 when the release mechanism 346 is moved to the right position in FIGS. 10 and 10a. As the end 330c of the membrane spring 330 is moved, in one embodiment, from a substantially relaxed or externally not stressed position, to an externally stressed position, the stresses that are built up in a Belleville disc or spring will distort the Belleville spring or membrane disc 30, such that an S-type curve forms in the membrane disc 30". These curve or S-curves are due to the inherent design and structure of Belleville springs, due to the restrictions on at least one portion of the Belleville spring. This portion of the Belleville spring may be the external periphery of the spring which restricts a substantial change in the outside diameter of the Belleville spring, or it may be a portion of the spring about which stresses propagate. Therefore, since the length of the Belleville spring from the inside diameter, represented by the end 330c, to the outside diameter, represented by the end 330a, of membrane disc 330, restricts the expansion of the membrane spring 330, these curves will form, which one embodiment will distort the end 330a of the Belleville or membrane disc 330, such that the membrane disc 330 distorts its holes 330b, and thus they clamp against the studs 336. When the Belleville washer or membrane spring 330 assumes a less stressed position, the holes 330b move such that their longitudinal axes are preferably in alignment with the longitudinal axes of the studs 336. In an alternative embodiment, the longitudinal axes of the studs 336 and the holes 330b may not be aligned, and the holes 330b may not have their longitudinal axis substantially perpendicular to the plane of the end 330a of the membrane spring 330. Therefore, depending upon the inherent characteristics of the membrane disc 330 which is used in a particular embodiment, the holes may or may not have a longitudinal axes which are perpendicular to the surface of the end 330a of the membrane spring 330. However, usually, and preferably, the holes 330b have longitudinal axes which are perpendicular or substantially perpendicular to the opposite surfaces of the membrane disc 330.

As can be seen in FIGS. 10 and 10a, the membrane disc 330 is preferably substantially thicker than the application means 331, which application means is also preferably a Belleville or a membrane disc. By making the membrane disc 330 thicker than the application means 331, the stresses which propagate through the Belleville or membrane disc 330, will set up stresses which are different at the different outer major surfaces of the membrane or Belleville disc 330, which stresses will provide the undulating or S-shaped distortions in the membrane disc 330. In one embodiment, by providing a somewhat different material characteristic at the contact points 324, such that, the contact point 324 may act as a fulcrum point whereby the stresses are propagated from the inside portion of the Belleville or membrane disc 330, and restricted by the contact points 324, to the outer portion of the membrane disc 330 at the end 330a, the end 330a will move back and forth in FIG. 10 and 10a in a left and right manner, such that the distortion of the end 30a" forms a one position, in which the holes 330b are aligned with the studs 336 and another position, preferably in one embodiment when the S-shape or other shape has been formed at the end 330a of the membrane disc 330, which distortion will clamp the holes 330d onto the studs 336.

In FIGS. 8–11, the outer diameter end of the membrane spring 330, at least in one sub-embodiment of each of the embodiments of FIGS. 8–11, the outer end of the membrane spring 330 distorts so that it grips studs or other guiding means.

Some examples of clutch assemblies and various components associated therewith which could possibly utilize the present invention may be disclosed in the following U.S. Patents: U.S. Pat. No. 4,684,007 to Maucher, entitled "Clutch Plate"; U.S. Pat. No. 4,635,780 to Wiggen, entitled "Clutch Disc for a Motor Vehicle Friction Clutch"; U.S. Pat. No. 4,651,857 to Schraut et al., entitled "Clutch Disc Unit for a Motor Vehicle Friction Clutch"; U.S. Pat. No. 5,103,688 to Kuhne, entitled "Two-mass Flywheel"; and U.S. Pat. No. 4,777,843 to Bopp, entitled "Two-mass Flywheel Assembly With Viscous Damping Assembly".

Some examples of hydraulic clutch systems which could possibly utilize the piston-cylinder arrangement of the present invention are disclosed by the following U.S. Patents, each of which is assigned to the assignee of the present invention: U.S. Pat. No. 5,211,099 to Grosspietsch et al., dated May 18, 1993 and entitled "Slave Cylinder for a Hydraulic Actuating System of a Motor Vehicle Friction Clutch"; U.S. Pat. No. 5,052,279 to Limbacher and Fadler, dated Oct. 1, 1991 and entitled "Hydraulic Cylinder for a Hydraulic Actuation Arrangement of a Motor Vehicle Friction Clutch"; and U.S. Pat. No. 4,456,111 to Limbacher, dated Jun. 26, 1984 and entitled "Hydraulic Control System for a Clutch".

Types of clutch assemblies having pedal linkages which could be utilized in accordance with the present invention may be disclosed in the following U.S. Patents: U.S. Pat. No. 4,987,983 to Adams, dated Jan. 29, 1991, entitled "Dual-mode Powered Clutch Actuator"; U.S. Pat. No. 5,139,126 to Perez, dated Aug. 18, 1992, entitled "Control Device for a Clutch, In Particular for an Automotive Vehicle"; and U.S. Pat. No. 5,217,097 to Lasoen, dated Jun. 8, 1993, entitled "Control System for a Fluid Pressure Operated Clutch".

Hydraulic braking systems which could also possibly utilize the present invention may be disclosed in the following U.S. Patents: U.S. Pat. No. 4,634,190 to Wupper, entitled "Hydraulic Brake System With Slip Control"; U.S. Pat. No. 4,643,488 to Reinartz, entitled "Hydraulic Vehicle Servo Brake"; U.S. Pat. No. 4,643,489 to Reinartz et al., entitled "Hydraulic Brake System With Slip Control"; U.S. Pat. No. 4,656,833 to Belart, entitled "Hydraulic Brake System for Automotive Vehicles"; and U.S. Pat. No. 4,902,077 to Belart et al., entitled "Hydraulic Brake System".

One feature of the invention resides broadly in the clutch disc for a friction clutch, comprising a hub with internal gear teeth for attachment to a transmission shaft which defines an axis of rotation, friction linings in the form of annular discs which are concentric to the axis of rotation and are at some radial distance from the hub, connecting elements between the hub and friction linings in the form of elements like leaf springs, the webs or lengths of which extend essentially in the plane of the clutch disc, characterized by the fact that distributed over the circumference there are several leaf-spring-like elements 5–10, which are each fastened in its central area to the hub 2, run essentially tangentially to the axis of rotation 3 and at some radial distance from the latter, pointing in both directions away from the fastening point, and are connected via their terminal areas to the friction linings 4.

Another feature of the invention resides broadly in the clutch disc characterized by the fact that there are preferably four elements which are arranged in pairs in a plane, and which are opposite one another with respect to the hub 2, whereby one pair is rotated from the other pair with respect to the axis of rotation 3 by approximately 90 degrees, and each element 5–8 crosses two others.

Yet another feature of the invention resides broadly in the clutch disc characterized by the fact that the friction linings 4 are held by spring segments 11 which have fastening feet 15 radially inward of the friction surfaces.

Still another feature of the invention resides broadly in the clutch disc characterized by the fact that each element 5 is riveted in its terminal area to a spring segment 11, such that one pair of elements 5 is in contact with the fastening feet 15 from the one side, and the other pair from the other side.

A further feature of the invention resides broadly in the clutch disc characterized by the fact that each element 5 is riveted in its terminal area to a spring segment 11, such that all elements 5 are connected from one side to the fastening feet 15, possibly with spacers on those terminal areas which are farther away from the fastening feet 15.

Another feature of the invention resides broadly in the clutch disc whereby the friction linings are held by spring segments, characterized by the fact that each element 6 in its terminal areas is formed in one piece with a spring segment 12.

Yet another feature of the invention resides broadly in the clutch disc characterized by the fact that the elements 5–10 are fastened to the hub 2 by means of arms 16 which project radially from the hub 2.

Still another feature of the invention resides broadly in the clutch disc characterized by the fact that the elements 5–10 are fastened to the arms 16, preferably by rivets.

A further feature of the invention resides broadly in the clutch disc characterized by the fact that the elements 5, 6 are curved in their longitudinal direction.

Another feature of the invention resides broadly in the clutch disc characterized by the fact that the elements 5, 6 are curved radially outward.

Yet another feature of the invention resides broadly in the clutch disc characterized by the fact that there are preferably three elements 9, 10 which are arranged around the circumference, and are offset from one another by approximately 120 degrees.

Still another feature of the invention resides broadly in the clutch disc characterized by the fact that the elements 9, 10 are curved over their longitudinal extension so that they are curved inward.

A further feature of the invention resides broadly in the clutch disc whereby the friction linings are held by spring segments which are provided radially inward of the friction surfaces with fastening feet, characterized by the fact that each element 9 is riveted in its terminal areas to a spring segment 13.

Another feature of the invention resides broadly in the clutch disc whereby the friction linings are held by spring segments, characterized by the fact that each element 10 in its terminal areas is always formed in one piece with a spring segment 14.

Yet another feature of the invention resides broadly in the clutch disc characterized by the fact that the ends of two elements 9, 10 next to one another circumferentially are connected to a common spring segment 13, 14.

Still another feature of the invention resides broadly in the clutch disc characterized by the fact that the elements 9, 10 are fastened to the hub 2, preferably by means of rivets 17, by means of a flange encircling the hub 2, or by means of several arms 16 which project radially.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 16 949.3, filed on May 13, 1994, having inventors Joachim Lindner, Jörg Sudau, and Bernhard Schierling, and DE-OS P 44 16 949.3 and DE-PS P 44 16 949.3, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A clutch assembly for a motor vehicle, said clutch assembly comprising:

a flywheel defining an axis of rotation and an axial direction parallel to the axis of rotation;

a clutch disc;

a pressure plate for applying an axially directed force to said clutch disc, with respect to the axis of rotation of said flywheel, to engage said clutch disc with said flywheel;

said clutch disc being disposed between said flywheel and said pressure plate;

said clutch disc comprising an outer periphery;

said clutch disc comprising friction lining means;

said friction lining means being disposed at said outer periphery of said clutch disc;

said friction lining means for contacting said pressure plate and said flywheel during engagement of said clutch disc with said flywheel;

said friction lining means comprising a radially inner edge disposed towards said axis of rotation of said flywheel;

said radially inner edge of said friction lining means comprising an inner circumference;

means for actuating said clutch disc to engage said friction lining means between said pressure plate and said flywheel;

said clutch disc further comprising:
 a hub;
 means for connecting said friction lining means to said hub;
 said means for connecting comprising a plurality of connecting members;
 each said connecting member having a first end and a second end;
 said first end of each said connecting member being disposed at its corresponding first point of said inner circumference of said friction lining means;
 said second end of each said connecting member being disposed at its corresponding second point of said inner circumference of said friction lining means;
 each of said points of said inner circumference of said friction lining means being spaced a substantial angular distance from one another;
 said first end and said second end of each said connecting member extending between their corresponding said first point and second point on said inner circumference of said friction lining means;
 said first end and said second end of each said connecting member being disposed a substantial angular distance from one another;
 each said connecting member comprising a central portion disposed between said first end and said second end of each said connecting member;
 said first end of each said connecting member being disposed a substantial distance from said hub;
 said central portion of each said connecting member being disposed closer to said hub than said first end;
 said second end of each said connecting member being disposed a substantial distance from said hub; and
 said central portion of each said connecting member being disposed closer to said hub than said second end.

2. The clutch assembly according to claim 1 wherein:

each said connecting member comprises an elongated connecting member;

each said first end on each said elongated connecting member being disposed a predetermined distance away from its corresponding said second end;

said predetermined distance being a longitudinal length;

each said connecting member having a width transverse to said length;

said width being substantially perpendicular to said axis of rotation; and said length being substantially greater than said width.

3. The clutch assembly according to claim 2 wherein each said first end and its corresponding second end are spaced apart from one another along a substantial portion of said inner circumference of said friction lining means.

4. The clutch assembly according to claim 3 wherein:

each said central portion is disposed about said hub;

said central portion comprises means for connecting said central portion to said hub;

said hub having an axis of rotation parallel to said axis of rotation of said flywheel; and each said central portion is disposed a substantial radial distance from said axis of rotation of said hub.

5. The clutch assembly according to claim 4 wherein:

each said connecting member comprises a flexible, springlike material;

each said connecting member has a thickness;

said thickness being substantially smaller than said width;

said thickness being substantially smaller than said length of each said connecting member;

said thickness, said width, said length, and said flexible, springlike material of each said connecting member being configured to provide flexibility to said clutch disc.

6. The clutch assembly according to claim 5 wherein:

the connecting means on said central portion of each said connecting member are disposed at a substantial portion of distance from said axis of rotation to said inner circumference of said friction lining means.

7. The clutch assembly according to claim 6 wherein:

said substantial angular distance between each said first and said second end of each connecting member is at least about 90 degrees.

8. The clutch assembly according to claim 7 wherein:

said substantial angular distance between each said first and said second end of each connecting member is less than about 180 degrees.

9. The clutch assembly according to claim 8 wherein:

said length of each said connecting member comprises a substantial portion of each said connecting member;

said substantial portion of each said connecting member comprises at least one of a) and b) as follows:
 a) a straight portion, and
 b) an arcuate portion.

10. The clutch assembly according to claim 9 wherein:

said connecting members comprise at least three of said connecting members;

each said substantial portion comprising said arcuate portion;

said substantial angular distance of each said substantial portion being at least 90 degrees.

11. The clutch assembly according to claim 10 wherein:

each said arcuate portion comprises at least one of c) and d) as follows:
- c) a curvature extending radially inward;
    - each said curvature having a first side and a second side;
    - said first side facing toward said hub;
    - said second side facing toward said friction lining means;
    - said first side forming a convex shape;
    - said second side forming a concave shape, and
- d) a curvature extending radially outward;
    - each said curvature having a first side and a second side;
    - said first side facing toward said hub;
    - said second side facing toward said friction lining means;
    - said first side forming a concave shape;
    - said second side forming a convex shape.

12. The clutch assembly according to claim 11 wherein:

said substantial angular distance between each said first and said second end of each connecting member is at least 120 degrees.

13. The clutch assembly according to claim 10 wherein:

said connecting members comprise at least four connecting members;

said at least four connecting members comprises a first pair and a second pair;

each said first pair and said second pair of said connecting members being disposed in their corresponding planes;

each said pair of said connecting members are disposed opposite one another with respect to said axis of rotation of said hub;

each pair being disposed relative to another pair by about 90 degrees;

at least a portion of each said connecting member being in contact with at least a portion of each of said substantially perpendicular, paired connecting members.

14. The clutch assembly according to claim 13 wherein:

each of said first end and said second end of each said connecting member has a width;

each said substantial portion of each said connecting member has a width;

said width of each of said first end and said second end being substantially greater than said width of each said substantial portion.

15. The clutch assembly according to claim 14 wherein:

said friction lining means comprises two friction linings;

said clutch assembly further comprising a plurality of segments;

said plurality of segments being disposed between said friction linings;

each said friction lining means having a surface;

said plurality of segments being disposed adjacent said surface of each said friction lining means;

said plurality of segments being disposed radially away from and about said axis of rotation of said hub; and each of said segments being disposed at respective ones of said first end and said second end of said connecting members.

16. The clutch assembly according to claim 15 wherein:

said segments comprise at least one of A) and B) as follows:
- A) an integral portion of said first and second ends, wherein each said connecting member and its corresponding segments disposed at each of said first end and said second end of each said connecting member comprise a single unit;
- B) separate segments separate from said first end and said second end of said connecting members, wherein said segments comprise means for fastening said segments to at least one of said first end and said second end of at least one said connecting member;
    - said means for fastening being disposed adjacent said inner circumference of said friction lining means;
    - said means for fastening extending radially inward toward said axis of rotation;
    - said first end of each said connecting member having at least one corresponding means for fastening to a segment;
    - said second end of each said connecting member having at least one corresponding means for fastening to a segment;
    - said means for fastening comprising connecting means for connecting said means for fastening with at least one of said first end and said second end of at least one of said connecting members.

17. The clutch assembly according to claim 16 wherein:

each said means for fastening has a first side and a second side;

said first side facing toward said clutch disc;

said second side facing away from said clutch disc;

connecting means for connecting said means for fastening to its corresponding end of its corresponding connecting member;

said connecting members are disposed on said means for fastening by at least one of C) and D) as follows:
- C) said one pair of said connecting members is disposed such that its corresponding said first and second ends are disposed adjacent said first side of said means for fastening;
    - said another pair of said connecting members is disposed such that its corresponding said first and second ends are disposed adjacent said second side of said means for fastening;
- D) both said pairs and their corresponding said first and second ends are disposed on one of said first and second sides of said means for fastening;
    - said one pair of said connecting members is disposed such that its corresponding said first and second ends are disposed substantially on one of said first and second sides of said means for fastening;
    - said another pair of said connecting members is disposed such that its corresponding said first and second ends are disposed on means for spacing;
    - said means for spacing said means for fastening from said corresponding first and second ends of said another pair of connecting members;
    - said means for spacing being disposed between each of said corresponding first and second ends of said another pair of connecting members;

means for fastening;

said hub comprising said plurality of connecting members further comprises:
means for attaching said plurality of connecting members to said hub;
said means for attaching comprising connecting means;
said connecting means comprises at least one of e) and f) as follows:
  e) at least one rivet;
  f) at least one weld;
    said means for attaching further comprising at least one of g) and h) as follows:
  g) a plurality of projecting portions;
    said plurality of projecting portions comprising four of said projecting portions;
    each said projecting portion being disposed concentrically about and in contact with said hub;
    each of said projecting portions radially extending outward with respect to said axis of rotation of said hub;
  h) a flange;
    said flange being disposed concentrically about and in contact with said hub;
said plurality of projecting portions comprises at least three said projecting portions;
said three projecting portions disposed about said hub for attaching three said connecting members to said hub;
said substantial angular distance between said first end and said second end of each said connecting member being about 120 degrees;
said friction lining means comprising three of said segments;
each said connecting member extending between at least one of said segments;
each said three segments comprises one of said means for fastening to said segment;
each said means for fastening being disposed substantially centrally on its corresponding said segment;
each said means for fastening comprising connecting means;
each said connecting means comprising at least one of i) and j) as follows:
  i) at least one rivet;
  j) at least one weld.

18. A clutch disc for a motor vehicle clutch assembly, said clutch disc comprising:
friction lining means;
said clutch disc comprising an outer periphery;
said friction lining means being disposed at said outer periphery of said clutch disc;
said clutch disc defining an axis of rotation and an axial direction parallel to the axis of rotation;
said friction lining means comprising a radially inner edge disposed towards said axis of rotation of said clutch disc;
said radially inner edge of said friction lining means comprising an inner circumference;
said clutch disc further comprising:
  a hub;
  means for connecting said friction lining means to said hub;
  said means for connecting comprising a plurality of connecting members;
  each said connecting member having a first end and a second end;
  said first end of each said connecting member being disposed at its corresponding first point of said inner circumference of said friction lining means;
  said second end of each said connecting member being disposed at its corresponding second point of said inner circumference of said friction lining means;
  each of said points of said inner circumference of said friction lining means being spaced a substantial angular distance from one another;
  said first end and said second end of each said connecting member extending between their corresponding said first point and second point on said inner circumference of said friction lining means;
  said first end and said second end of each said connecting member being disposed a substantial angular distance from one another;
  each said connecting member comprising a central portion disposed between said first end and said second end of each said connecting member;
  said first end of each said connecting member being disposed a substantial distance from said hub;
  said central portion of each said connecting member being disposed closer to said hub than said first end;
  said second end of each said connecting member being disposed a substantial distance from said hub; and
  said central portion of each said connecting member being disposed closer to said hub than said second end.

19. The clutch disc according to claim 18, wherein:
each said connecting member comprises an elongated connecting member;
each said first end on each said elongated connecting member being disposed a predetermined distance away from its corresponding said second end;
said predetermined distance being a longitudinal length;
each said connecting member having a width transverse to said length;
said width being substantially perpendicular to said axis of rotation;
said length being substantially greater than said width;
each said first end and its corresponding second end are spaced apart from one another along a substantial portion of said inner circumference of said friction lining means;
each said central portion is disposed about said hub;
said central portion comprises means for connecting said central portion to said hub;
said hub having an axis of rotation parallel to said axis of rotation of said flywheel;
each said central portion is disposed a substantial radial distance from said axis of rotation of said hub;
each said connecting member comprises a flexible, springlike material;
each said connecting member has a thickness;
said thickness being substantially smaller than said width;
said thickness being substantially smaller than said length of each said connecting member;
said thickness, said width, said length, and said flexible, springlike material of each said connecting member being configured to provide flexibility to said clutch disc;
the connecting means on said central portion of each said connecting member are disposed at a substantial portion of distance from said axis of rotation to said inner circumference of said friction lining means;

said substantial angular distance between each said first
and said second end of each connecting member is at
least about 90 degrees;

said substantial angular distance between each said first
and said second end of each connecting member is less
than about 180 degrees;

said length of each said connecting member comprises a
substantial portion of each said connecting member;

said substantial portion of each said connecting member
comprises at least one of a) and b) as follows:
a) a straight portion, and
b) an arcuate portion;

said connecting members comprise at least three of said
connecting members;

each said substantial portion comprising said arcuate
portion;

said substantial angular distance of each said substantial
portion being at least 90 degrees;

each said arcuate portion comprises at least one of c) and
d) as follows:
c) a curvature extending radially inward;
each said curvature having a first aide and a second
side;
said first side facing toward said hub;
said second side facing toward said friction lining
means;
said first side forming a convex shape;
said second side forming a concave shape, and
d) a curvature extending radially outward;
each said curvature having a first side and a second
side;
said first side facing toward said hub;
said second side facing toward said friction lining
means;
said first side forming a concave shape;
said second side forming a convex shape.

20. The clutch disc according to claim 19, wherein:

each said connecting member comprises an elongated
connecting member;

each said first end on each said elongated connecting
member being disposed a predetermined distance away
from its corresponding said second end;

said predetermined distance being a longitudinal length;

each said connecting member having a width transverse to
said length;

said width being substantially perpendicular to said axis
of rotation;

said length being substantially greater than said width;

each said first end and its corresponding second end are
spaced apart from one another along a substantial
portion of said inner circumference of said friction
lining means;

each said central portion is disposed about said hub;

said central portion comprises means for connecting said
central portion to said hub;

said hub having an axis of rotation parallel to said axis of
rotation of said flywheel;

each said central portion is disposed a substantial radial
distance from said axis of rotation of said hub;

each said connecting member comprises a flexible,
springlike material;

each said connecting member has a thickness;

said thickness being substantially smaller than said width;

said thickness being substantially smaller than said length
of each said connecting member;

said thickness, said width, said length, and said flexible,
springlike material of each said connecting member
being configured to provide flexibility to said clutch
disc;

the connecting means on said central portion of each said
connecting member are disposed at a substantial por-
tion of distance from said axis of rotation to said inner
circumference of said friction lining means;

said substantial angular distance between each said first
and said second end of each connecting member is at
least about 90 degrees;

said substantial angular distance between each said first
and said second end of each connecting member is less
than about 180 degrees;

said length of each said connecting member comprises a
substantial portion of each said connecting member;

said substantial portion of each said connecting member
comprises at least one of a) and b) as follows:
a) a straight portion, and
b) an arcuate portion;

said connecting members comprise at least three of said
connecting members;

each said substantial portion comprising said arcuate
portion;

said substantial angular distance of each said substantial
portion being at least 90 degrees;

said connecting members comprise at least four connect-
ing members;

said at least four connecting members comprises a first
pair and a second pair;

each said first pair and said second pair of said connecting
members being disposed in their corresponding planes;

each said pair of said connecting members are disposed
opposite one another with respect to said axis of
rotation of said hub;

each pair being disposed relative to another pair by about
90 degrees;

at least a portion of each said connecting member being
in contact with at least a portion of each of said
substantially perpendicular, paired connecting mem-
bers;

each of said first end and said second end of each said
connecting member has a width;

each said substantial portion of each said connecting
member has a width;

said width of each of said first end and said second end
being substantially greater than said width of each said
substantial portion;

said friction lining means comprises two friction linings;

said clutch assembly further comprising a plurality of
segments;

said plurality of segments being disposed between said
friction linings;

each said friction lining means having a surface;

said plurality of segments being disposed adjacent said
surface of each said friction lining means;

said plurality of segments being disposed radially away
from and about said axis of rotation of said hub; and each of said segments being disposed at respective ones of
said first end and said second end of said connecting
members;

said segments comprise at least one of A) and B) as follows:
- A) an integral portion of said first and second ends, wherein each said connecting member and its corresponding segments disposed at each of said first end and said second end of each said connecting member comprise a single unit;
- B) separate segments separate from said first end and said second end of said connecting members, wherein said segments comprise means for fastening said segments to at least one of said first end and second end of at least one said connecting member;

said means for fastening being disposed adjacent said inner circumference of said friction lining means;

said means for fastening extending radially inward toward said axis of rotation;

said first end of each said connecting member having at least one corresponding means for fastening to a segment;

said second end of each said connecting member having at least one corresponding means for fastening to a segment;

said means for fastening comprising connecting means for connecting said means for fastening with at least one of said first end and said second end of at least one of said connecting members;

each said means for fastening has a first side and a second side;

said first side facing toward said clutch disc;

said second side facing away from said clutch disc;

connecting means for connecting said means for fastening to its corresponding end of its corresponding connecting member;

said connecting members are disposed on said means for fastening by at least one of C) and D) as follows:
- C) said one pair of said connecting members is disposed such that its corresponding said first and second ends are disposed adjacent said first side of said means for fastening;
  said another pair of said connecting members is disposed such that its corresponding said first and second ends are disposed adjacent said second side of said means for fastening;
- D) both said pairs and their corresponding said first and second ends are disposed on one of said first and second sides of said means for fastening;
  said one pair of said connecting members is disposed such that its corresponding said first and second ends are disposed substantially on one of said first and second sides of said means for fastening;
  said another pair of said connecting members is disposed such that its corresponding said first and second ends are disposed on means for spacing;

said means for spacing said means for fastening from said corresponding first and second ends of said another pair of connecting members;

said means for spacing being disposed between each of said corresponding first and second ends of said another pair of connecting members;

means for fastening;

said hub comprising said plurality of connecting members further comprises:

means for attaching said plurality of connecting members to said hub;

said means for attaching comprising connecting means;

said connecting means comprises at least one of e) and f) as follows:
- e) at least one rivet;
- f) at least one weld;

said means for attaching further comprising at least one of g) and h) as follows:
- g) a plurality of projecting portions;
  said plurality of projecting portions comprising four of said projecting portions;
  each said projecting portion being disposed concentrically about and in contact with said hub;
  each of said projecting portions radially extending outward with respect to said axis of rotation of said hub;
- h) a flange;
  said flange being disposed concentrically about and in contact with said hub;

said plurality of projecting portions comprises at least three said projecting portions;

said three projecting portions disposed about said hub for attaching three said connecting members to said hub;

said substantial angular distance between said first end and said second end of each said connecting member being about 120 degrees;

said friction lining means comprising three of said segments;

each said connecting member extending between at least one of said segments;

each said three segments comprises one of said means for fastening to said segment;

each said means for fastening being disposed substantially centrally on its corresponding said segment;

each said means for fastening comprising connecting means;

each said connecting means comprising at least one of i) and j) as follows:
- i) at least one rivet;
- j) at least one weld.

* * * * *

UNITED STATES PATENT AND TRADEMARK OFFICE
CERTIFICATE OF CORRECTION

PATENT NO. : 5,566,803
DATED : October 22, 1996
INVENTOR(S) : Joachim LINDNER, Jörg SUDAU and Bernhard SCHIERLING It is certified that error appears in the above-indentified patent and that said Letters Patent is hereby corrected as shown below:

In column 3, line 50, after 'hub;', delete "and" and insert --an--.

In column 5, line 28, before '11', delete "segment" and insert --segments--.

In column 5, line 30, after 'leaf-spring-like', delete "element" and insert --elements--.

In column 5, line 31, after the first occurrence of 'the', delete "plans" and insert --plane--.

In column 5, line 56, after 'the', delete "lead-spring-like" and insert --leaf-spring-like--.

In column 5, line 57, after 'that', delete "show" and insert --shown--.

In column 6, line 34, after 'corresponding', delete "fasting" and insert --fastening--.

UNITED STATES PATENT AND TRADEMARK OFFICE
CERTIFICATE OF CORRECTION

PATENT NO. : 5,566,803
DATED : October 22, 1996
INVENTOR(S) : Joachim LINDNER, Jörg SUDAU and Bernhard SCHIERLING It is certified that error appears in the above-indentified patent and that said Letters Patent is hereby corrected as shown below:

In column 6, line 34, after '15', delete "ofthe" and insert --of the--.

In column 6, line 34, after 'spring', delete "segment" and insert --segments--.

In column 23, line 22, Claim 19, after 'first', delete "aide" and insert --side--.

Signed and Sealed this

Fourth Day of March, 1997

Attest:

BRUCE LEHMAN

Attesting Officer

Commissioner of Patents and Trademarks